US005202450A

United States Patent [19]

Satake et al.

[11] Patent Number: 5,202,450

[45] Date of Patent: Apr. 13, 1993

[54] PHTHALIC ACID DERIVATIVE METAL SALT AND SHADING AND LIGHT-RESPONSIVE PLATE CONTAINING THE METAL SALT

[75] Inventors: Toshimi Satake; Tomoaki Nagai; Hiroshi Fukui; Miyuki Yokoyama; Akio Sekine, all of Kita, Japan

[73] Assignee: Jujo Paper Co., Ltd., Tokyo, Japan

[21] Appl. No.: 589,372

[22] Filed: Sep. 27, 1990

[30] Foreign Application Priority Data

Sep. 27, 1989 [JP] Japan ................................ 1-250863

[51] Int. Cl.$^5$ ......................... C07F 1/08; C07F 15/02; C07F 15/04; C07F 15/06

[52] U.S. Cl. .................................. 556/44; 556/106; 556/115; 556/147; 556/150

[58] Field of Search ................ 556/44, 106, 115, 147, 556/150; 562/480

[56] References Cited

U.S. PATENT DOCUMENTS 3,689,427 9/1972 Matsuda et al. ................ 252/188.3
3,899,382 8/1975 Matsuda et al. .................... 156/327
4,193,803 3/1980 Sandhu et al. ...................... 430/627

FOREIGN PATENT DOCUMENTS 0281991 9/1988 European Pat. Off. .

OTHER PUBLICATIONS

Chemical Abstracts, vol. III, No. 8, 21 Aug. 1989, Columbus, Ohio, US; abstract no. 58837E, T. Okamoto et al.

*Primary Examiner*—Jose G. Dees
*Assistant Examiner*—Porfirio Nazario

[57] ABSTRACT

A shading and light-responsive plate or film is composed of a transparent polymer containing a novel phthalic acid derivative metal salt and further a near infrared ray shading plate or film is composed of a transparent polymer containing the aforesaid phthalic acid derivative copper salt or lead salt and a near infrared absorbing coloring material formed from a thioamide derivative or thiourea derivative.

2 Claims, 22 Drawing Sheets

PHTHALIC ACID DERIVATIVE METAL SALT AND SHADING AND LIGHT-RESPONSIVE PLATE CONTAINING THE METAL SALT

FIELD OF THE INVENTION

This invention relates to a novel phthalic acid derivative metal salt.

Furthermore, the invention relates to a plate containing the metal salt and having a shading property and light-responsive property.

BACKGROUND OF THE INVENTION

Hitherto, as organic metal compounds having a solubility in organic solvents, naphthenic acid metal salts are known. Since metal salts such as Pb salts, Co salts, Mn salts, etc., of naphthenic acid are resinous, have a high solubility for fat and oil solvents, and have a high metal content, these metal salts are widely used as a dryer for increasing the drying property of a paint and a varnish by adding thereto a small amount thereof. Also, metal salts such as Cu salts, Zn salts, etc., of naphthenic acid have an insecticidal activity and hence are used as insecticidal and germicial agents, a ship bottom coating, wood preservatives, etc. However, since the aforesaid compound itself has no polymerizability and does not have a sufficient solubility for a liquid monomer forming a polymer, the compound can not be utilized as one component for a copolymerization reaction.

Also, a mental alkoxide is generally soluble in an organic solvent and is utilized for producing a functional thin film or layer by a dipping method or a spinner method.

However, although a metal alkoxide has a high reactivity, the metal alkoxide is hydrolyzed even by the moisture in air owing to the property of being very easily hydrolyzed and further is caused to react with carbon dioxide. Thus, the operation of dissolving the metal alkoxide in an organic solvent and the operation of recovering it must be performed in a gloved box (replaced with dry nitrogen gas) for preventing contact with air. Also, in the case of storing a metal alkoxide, a closed container must be used.

Furthermore, metal alkoxides other than the alkoxide of alkali metals and alkaline earth metals have a property of being volatile, thereby they are hard to handle. Also, according to the kinds of metals, the solubility of metal alkoxides in an organic solvent differs as well as the solubility of metal alkoxides is generally not high. Thus, it is difficult to obtain an organic metal compound showing the characteristics of the metal according to the kind of the metal.

SUMMARY OF THE INVENTION

An object of this invention is to provide an organic metal compound which has a high solubility in an organic solvent and a monomer, has a high stability, can be easily handled, and takes part in a polymerization reaction by itself.

Other object of this invention is to provide a transparent polymer, in particular, a plate or a film by a polymerization reaction of the aforesaid organic metal compound and a monomer utilizing the property of the organic metal compound, said plate or film having a shading effect and a light-responsive effect according to the characters of the metal salt.

The aforesaid objects of this invention have been attained by the provision of a novel metal salt of a phthalic acid derivative represented by following general formula (I).

Moreover, a still further object of this invention is to provide a plate or a film of a transparent polymer having a near infrared ray shading property.

The aforesaid object of this invention has been attained by using the novel copper or lead salt of the phthalic acid derivative represented by following general formula (I) (formula(I) wherein Me is copper or lead is shown by formula(I') as described in claims) and a thioamide derivative represented by following general formula (III) or a thiourea derivative represented by following general formula (IV).

The novel phthalic acid derivative metal salt of this invention is shown by the following general formula (I):

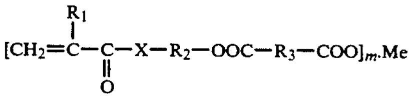
(I)

wherein $R_1$ represents a hydrogen atom or a lower alkyl group; —X— represents —O— or —NH—; $R_2$ represents a $—(CH_2)_n—$ which may be substituted by a lower alkyl group and/or a halogen atom, and further a part of said $—(CH_2)_n—$ may be substituted by a phenylene group

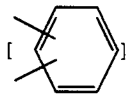

and/or —CH═CH—; $R_3$ represents a phenylene group

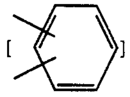

or a cyclohexylene group

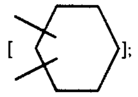

Me represents a divalent or trivalent metal; m represents 2 or 3; and n represents an integer of from 1 to 5.

DETAILED DESCRIPTION OF THE INVENTION

Figure 1:
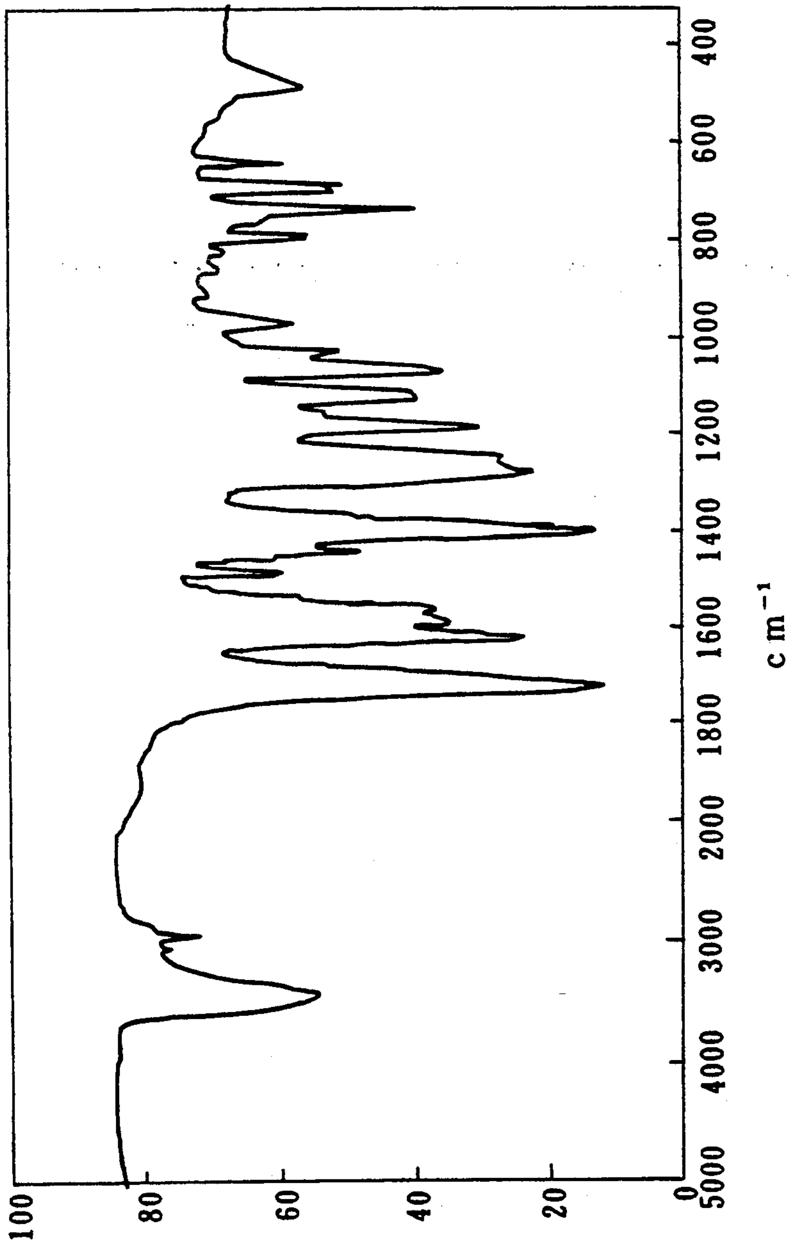
FIG. 1 to FIG. 6 are graphs showing the infrared absorption spectra of the organic metal compounds obtained in Examples 1 to 6, respectively.

Then, the invention is explained in detail.

The lower alkyl group in this invention means an alkyl group having from 1 to 5 carbon atoms, such as, in particular, methyl and ethyl, and a halogen atom means chlorine, bromine, fluorine, etc.

The metal (Me) in this invention is suitable a metal selected from Cu, Nd, Co, Fe, Pb, Ni, V, VO, W, and Ce.

The organic metal compound of this invention shown by general formula (I) has a high solubility in organic solvents and polymerizable monomers such as methyl methacrylate, etc., and can cause a polymerization reaction by itself at the portion of the double bond of the acrylate group (when $R_1$ is H).

The compounds of this invention shown by the general formula (I) can be obtained as precipitates by dispersing a compound (phthalic acid monoester derivative) shown by following general formula (II) in water, adding thereto sodium hydroxide, sodium hydrogencarbonate, etc., to substitute sodium for the carboxy group and to form an aqueous solution, and adding an aqueous solution of the water-soluble salt of the aforesaid divalent or trivalent metal to the aqueous solution thus formed.

$$CH_2{=}\overset{R_1}{\overset{|}{C}}-\underset{\underset{O}{\|}}{C}-X-R_2-OOC-R_8-COOH \qquad (II)$$

wherein X, $R_1$, $R_2$, and $R_3$ have same meaning as in the general formula (I).

The precipitates formed as above have a different color formed according to the kind of the metal salt and thus each shows a different shading property.

Specific examples of the compound of formula (II) being used as a starting material for obtaining the organic metal compound of this invention are shown below but the invention is not limited to these compounds.

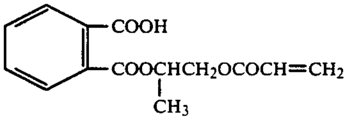

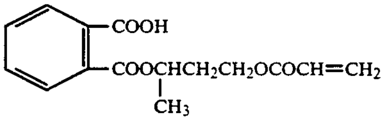

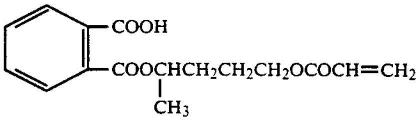

-continued

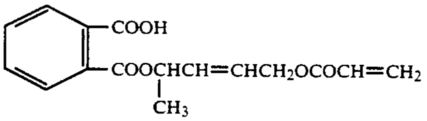

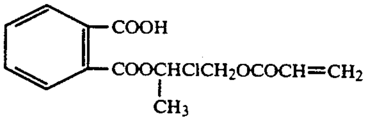

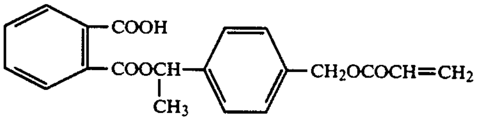

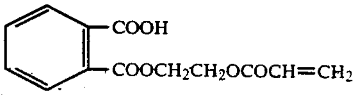

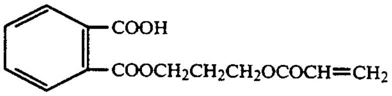

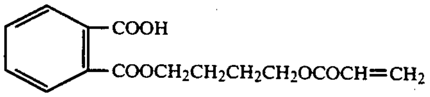

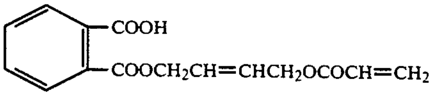

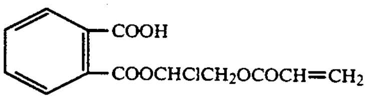

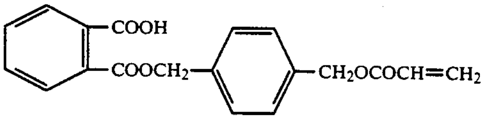

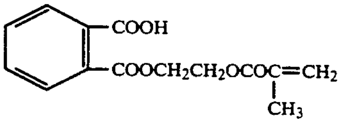

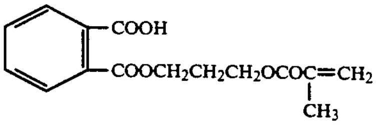

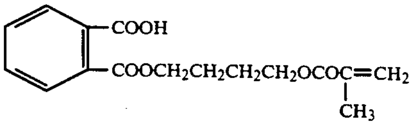

-continued

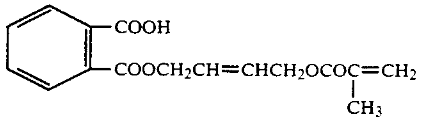

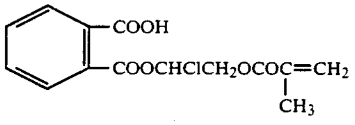

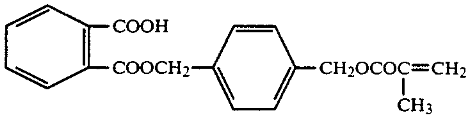

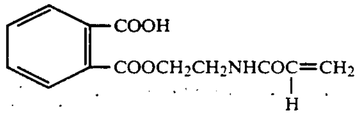

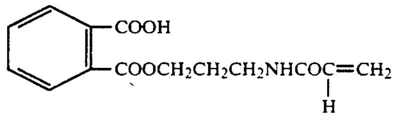

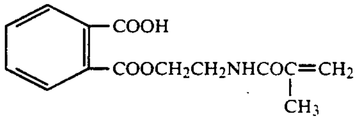

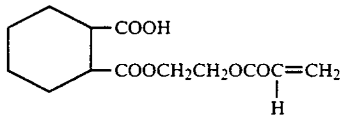

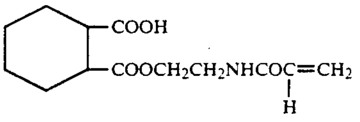

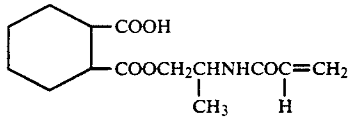

The compound shown by the aforesaid formula (II) is a viscous transparent liquid which is insoluble in water but by neutralizing the compound into an alkali metal salt, the compound becomes water-soluble.

The neutralization of the compound into an alkali metal salt can be conducted by using a hydroxide, a bicarbonate, etc., of an alkali metal, such as, preferably sodium hydroxide, sodium hydrogencarbonate, etc.

Also, as the water-soluble salt of a divalent or trivalent metal in this invention, there are copper(II) sulfate.-penta-hydrate, neodymium chloride hexa-hydrate, iron-(III) sulfate n-hydrate, etc.

The aforesaid precipitates of the compound shown by the formula (I) of this invention are collected, dried, ground, and stored.

The compound of this invention shown by formula (I) is a novel compound in chemical structure and the properties thereof have been confirmed by infrared absorption spectra, etc.

Also, the compound is easily soluble in organic solvents, polymerizable monomers, etc., and since the compound itself functions as a monomer, the compound has a high utility value as a functional monomer for a polymer. Furthermore, since the polymer obtained is transparent and shows a specific shading character according to a metal, the polymer can be utilized as various kinds of plates and films, ultraviolet ray cut filters, near infrared ray cut filters, gamma-ray cut filters, etc.

Thus, the invention further relates to such a shading and light-responsive plate (including film in this invention) of the transparent polymer containing the compound of this invention shown by the formula (I).

The shading and light-responsive plate of the transparent polymer of this invention can be produced by forming a polymer using the compound shown by the formula (I) and, if necessary, a thiourea derivative, a thioamide derivative, a photochromic material, various monomers, etc., which will be described herein below and molding the polymer thus formed. Thus, the plate of this invention has a shading effect corresponding to the light-absorption characteristics of the metal salt being used.

Also, a transparent plate having a shading property and a light-responsive property for a ultraviolet portion by the characteristics of a photochromic material being used can be obtained.

In this invention, it is preferred that the compound shown by the formula (I) is added to the monomer(s) for forming the transparent polymer in an amount of from 0.3 to 20% by weight of the weight of the monomers.

Also, a copper compound or lead compound is selectively used as the metal salt of this invention and by heat-treating a composition composed of the copper compound or lead compound and a thiourea derivative represented by following formula (IV) shown below or a thioamide derivative represented by following formula (III) shown below according to another embodiment of this invention, a transparent plate having a near infrared ray shading effect can be obtained.

Also, a plate having a light shading effect can be formed by uniformly mixing the phthalic acid monoester derivative of the invention, the thioamide derivative, the thiourea derivative, the photochromic material, etc. with a plastic already polymerized, heat melting the polymer with extrusion through an extruder and at the same time in this step forming a near infrared absorbing material in the polymer to form near infrared ray absorptive pellets and molding the functional pellets. It is preferable that a cylinder temperature of the extruder is about from 130° to 300° C.

As the aforesaid plastic already polymerized, which can be used in the above step, there are thermo-plastic resins such as polycarbonate, a vinyl chloride resin, polyethylene, polystyrene, polypropylene, nylon, an polyacrylic resin, a polymethacrylic resin, etc.

Also, as a method of uniformly mixing the aforesaid components with the plastic, a method of using a tumbler, a mixer, a blender, etc., can be used and it is preferred that the plate is molded in a uniform state through colored pellets once compounded or a master batch step.

The thioamide derivative or the thiourea derivative which is required for forming the plate having a near infrared ray shading effect can be shown by following general formula (III) or (IV), respectively.

That is, the thioamide derivative for use in this invention is represented by following general formula (III);

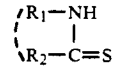

(III)

wherein $R_1$ and $R_2$ each represents a monovalent group selected from a hydrogen atom, an alkyl group of $C_1$–$C_{18}$, an alkenyl group, a cycloalkyl group of $C_3$–$C_9$, an aryl group of $C_6$–$C_{18}$, an aralkyl group of $C_7$–$C_{12}$, and a 5- or 6-membered heterocyclic group which contains at least one of atoms selected N, S and O, or $R_2$ further represents an alkoxy group, each group may have one or more substituents, and said $R_1$ and $R_2$ may combine with each other to form a ring.

Also, the thiourea derivative for use in this invention is represented by following general formula (IV);

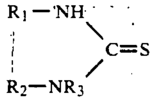

(IV)

wherein $R_1$, $R_2$, and $R_3$ have the same meaning as $R_1$ and $R_2$ in formula (III) described above. Each group may have one or more substituents, and said $R_1$ and $R_2$ or said $R_2$ and $R_3$ may combine with each other to form a ring.

Examples of the aforesaid alkyl group are methyl, ethyl, n-propyl, iso-propyl, n-butyl, sec-butyl, tert-butyl, iso-butyl, n-amyl, n-hexyl, n-heptyl, n-octyl, and n-nonyl.

As the cycloalkyl group, there are cyclohexyl, p-methylcyclohexyl, etc.; as the aralkyl group, there are benzyl, methylbenzyl, phenylethyl, naphthylmethyl, etc.; and as the aryl group, there are phenyl, tolyl, biphenyl, naphthyl, etc.

Specific examples of these derivatives [formula (III) and (IV)] are shown below.

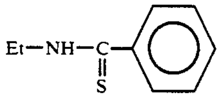

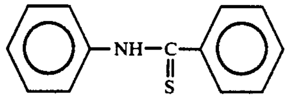

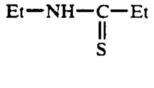

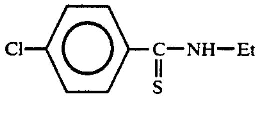

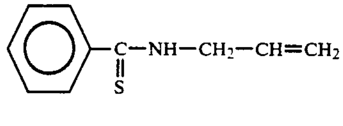

-continued

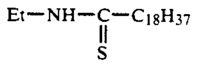

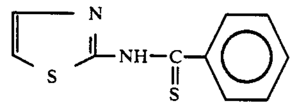

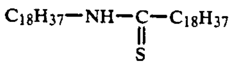

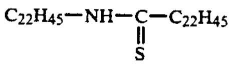

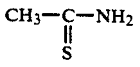

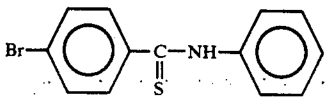

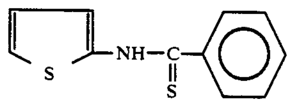

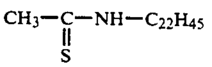

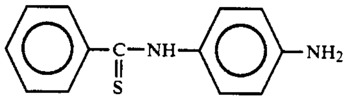

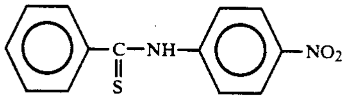

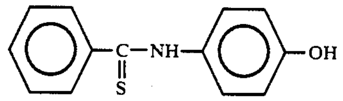

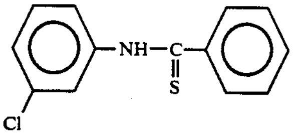

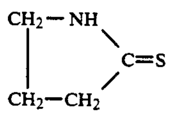

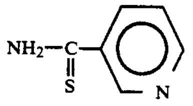

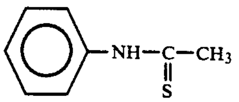

-continued
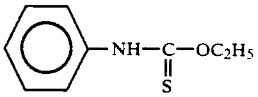
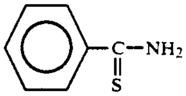
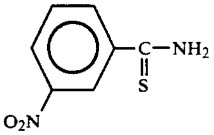
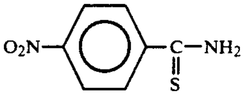
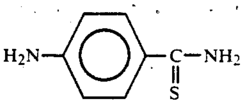
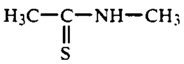
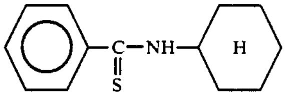
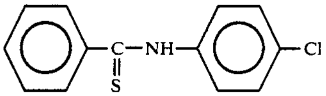
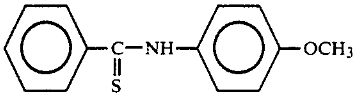
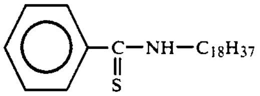
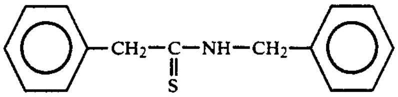
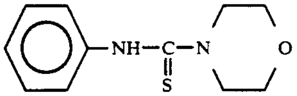
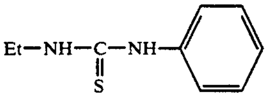
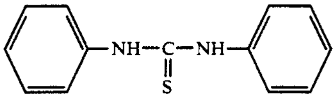
-continued
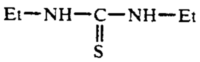
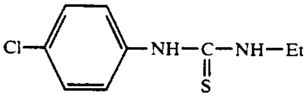
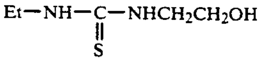
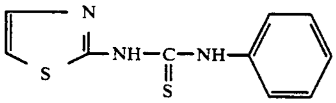
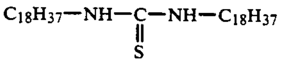
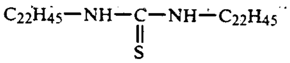
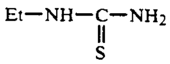
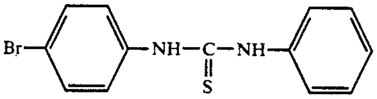
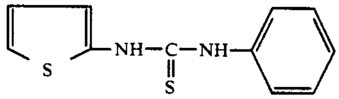
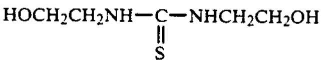
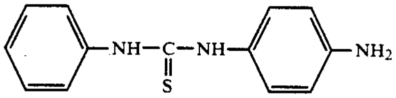
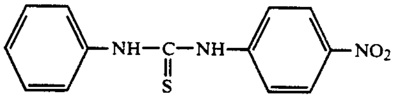
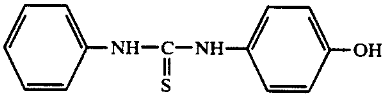
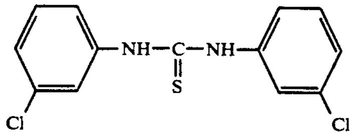
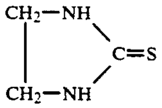

-continued

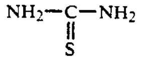

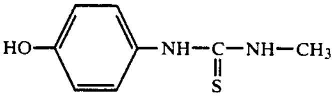

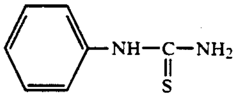

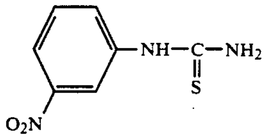

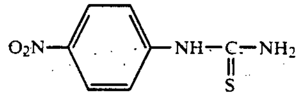

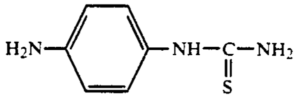

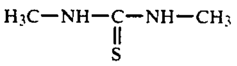

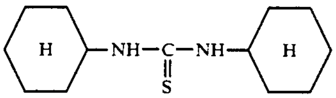

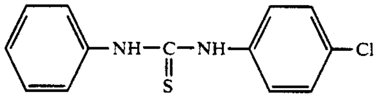

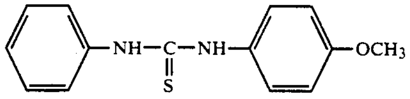

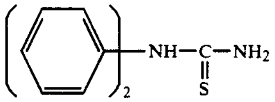

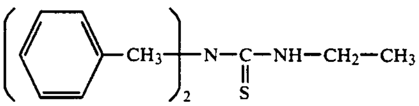

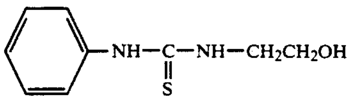

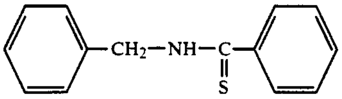

As the compounding ratio of the thiourea derivative or the thioamide derivative to the copper salt or lead salt of the phthalic acid derivative, the ratio of copper or lead to sulfur is preferably from about 1:0.5 to 1:10, and more preferably from 1:2 to 1:8.

For obtaining sufficient effect of this invention, the total amounts, of the copper salt or lead salt of the phthalic acid derivative and thiourea derivative or the thioamide derivative to 100 parts by weight of the polymerizable monomer is from about 0.1 to 1.5 parts by weight, and preferably from about 0.2 to 1.0 part by weight.

Further, a near infrared absorbing, coloring material with heat resistance is formed with heating sufficiently the thiourea derivative, or the thioamide derivative in the presence of the copper salt or lead salt of the phthalic acid derivative, for example with heating for dozens of minutes at below 100° C. or a few seconds at about from 200° to 300° C.

Also, specific examples of the photochromic material which can be used in this invention are illustrated below and a suitable compound is spironaphthoxazine but the invention is not limited to these compounds.

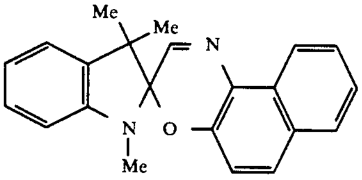

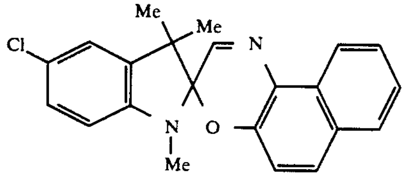

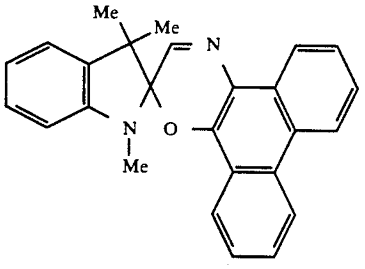

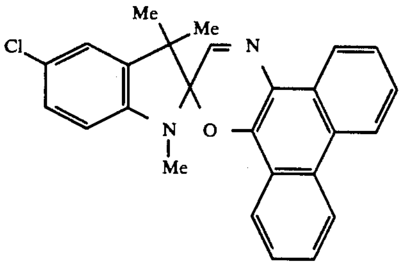

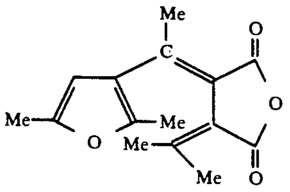

-continued

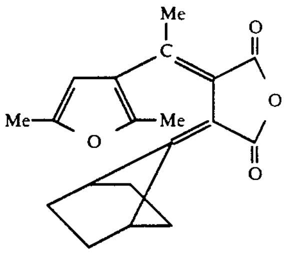

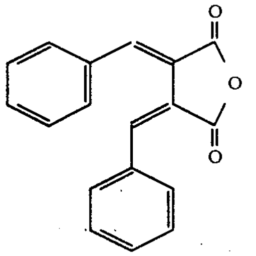

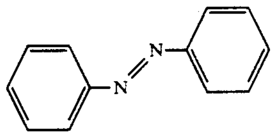

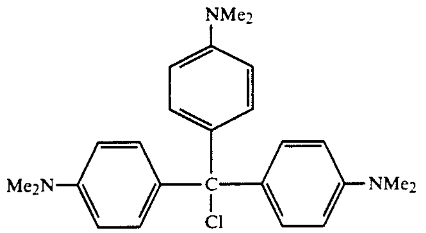

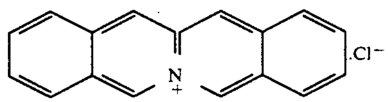

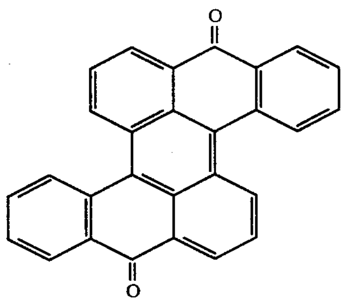

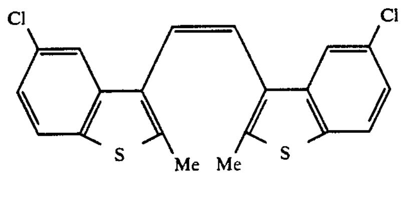

-continued

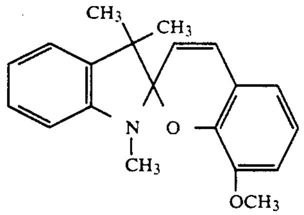

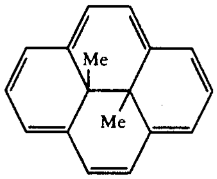

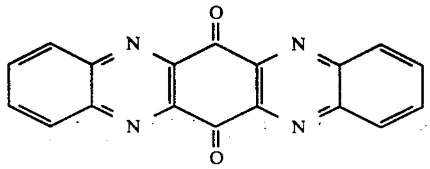

In this invention, acrylic acid, methacrylic acid, or other well-known monomer(s) are used, and by a well-known polymerization means, a polymer such as polyacrylic acid, polymethacrylic acid, polyacrylic acid ester, polymethacrylic acid ester, polyolefin, polyvinyl chloride, polyvinylidene chloride, polycarbonate, polystyrene, polyester, polyvinyl acetate, polyvinyl alcohol, etc., can be obtained. In these polymers, polyacrylic acid, polymethacrylic acid, polyacrylic acid ester, polymethacrylic acid ester, polystyrene, polyvinyl acetate, etc., is preferably produced by the bulk polymerization of one or more monomers.

Also, in regard to polyolefin, polyvinyl chloride, polyvinylidene chloride, polycarbonate, polystyrene, polyester, and polyvinyl acetate, after polymerizing one or more monomers thereof, the film thereof can be formed by a melt extrusion method. Also, in regard to polyvinyl chloride, polycarbonate, a methacryl resin, polystyrene, polypropylene, and polyethylene, after polymerization, the plate or film thereof can be formed by a solution flow stretching method.

In this invention, by combining the aforesaid organic metal salt of this invention and a photochromic material according to another embodiment of this invention, a transparent film or plate having a shading property and a light-responsive property in a wide wavelength region can be produced and they can be utilized as ultraviolet ray cut filters, etc.

The transparent ultraviolet ray shading and ultraviolet ray-responsive plate can be utilized for the following use.

That is, since the plate is transparent or transmits visible light, the plate can be used as a sun glass or a window glass capable of shading harmful ultraviolet rays without giving any inconvenience for seeing the seashore, a skiing ground, high mountains, welding, etc.

A plate obtained by polymerizing the phthalic acid derivative copper salt or lead salt the thiourea compound or the thioamide compound with a methacryl acid methyl monomer or a plate obtained by extrusion molding colored pellets formed from a dry blend of a polymer such as polymethylmethacrylate, polycarbonate, polystyrene, polyethylene, a vinyl chloride resin, etc., and the aforesaid two components, i.e., the phthalic acid derivative copper salt or lead salt and the thiourea compound or the thioamide is a heat absorbing material showing good viewing property and hence the plate can supply bright and cool light when used as building materials in an exterior field.

Also, the plate using a photochromic material together not only shades ultraviolet rays but also is discolored when irradiated by ultraviolet rays, and hence it can detect invisible ultraviolet rays leaked from, for example, hardening apparatus for hardening a ultraviolet ray hardening resin or ink and at the same time shade the ultraviolet rays.

Furthermore, the discoloring by ultraviolet rays is generally reversible but becomes irreversible at low temperature and a stable colored state can be maintained at low temperature. Thus, the plate can be utilized as a detection and shading plate of ultraviolet rays emitted from a ultraviolet lamp being used for the sterilization in a refrigerator or a detection and shading plate for inspecting the state in a sterile room.

Then, the invention is described more practically by the following examples.

EXAMPLE 1

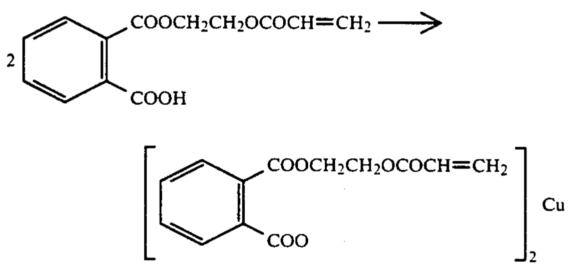

A mixture of 5 g of acryloyloxyethyl hydrogenphthalate and 200 ml of water was stirred using a stirrer to raise the temperature to 60° C. Then, after adding thereto 50 ml of an aqueous solution of 1.6 g of sodium hydrogencarbonate, the resultant mixture was stirred for 20 minutes at 60° C. When the additive was completely dissolved, the solution was cooled to 30° C. and 50 ml of an aqueous solution of 2.5 g of copper(II) sulfate penta-hydrate was added thereto to provide immediately blue-green precipitates.

Since if the system is stirred, the precipitates become viscous and finally become massive, the precipitates were immediately collected by filtration, washed with water to remove unreacted sodium salt, etc., dissolved in acetone, and insoluble matters were filtered away. Acetone was distilled off from the filtrate, the residue was ground and further dried under reduced pressure to provide 4.7 g of a blue-green dry product.

The dry product was stored in a desiccator.

Melting point: 101° C.

| Elemental Analysis: | C | H | O |
|---|---|---|---|
| Calculated: | 52.92% | 3.77% | 32.54% |
| Found: | 53.01% | 3.75% | 32.46% |

Figure 16:
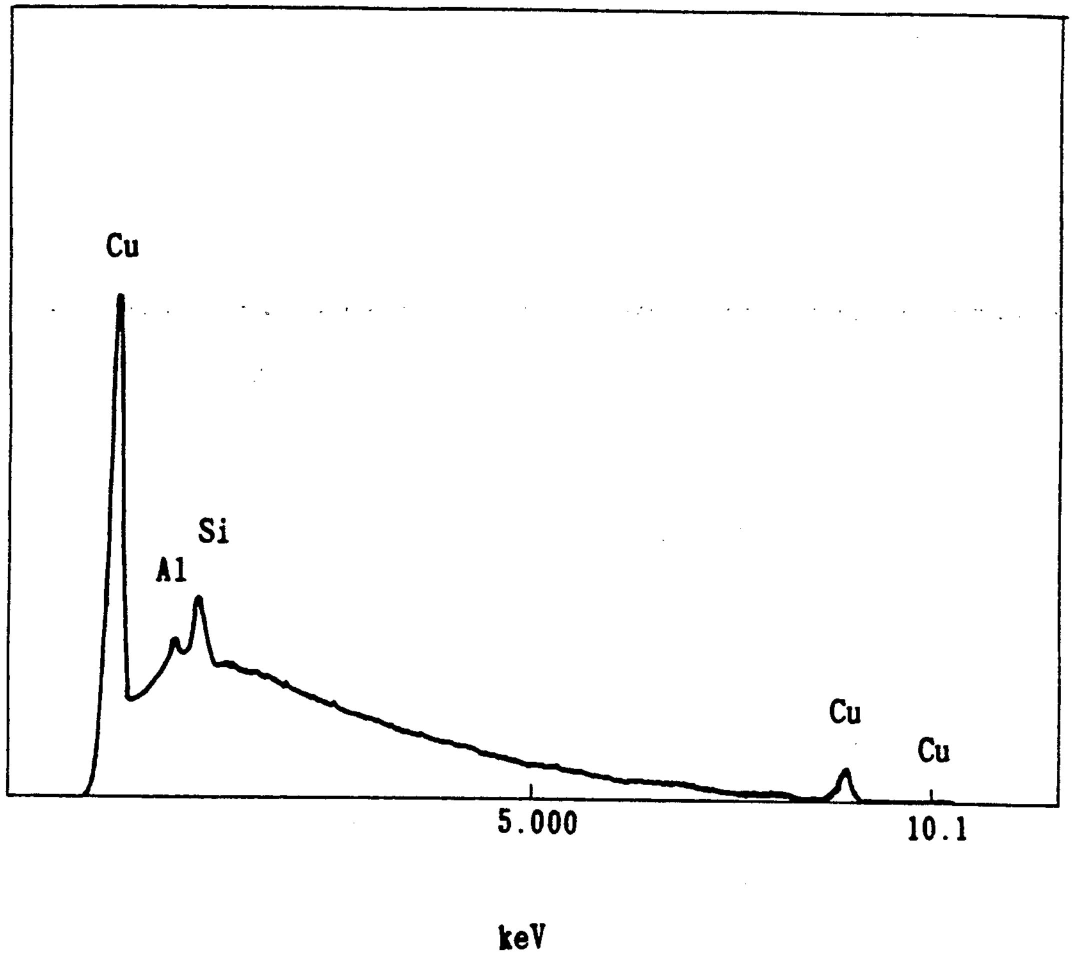
FIG. 16–21 are graphs showing the X-ray analysis of the organic metal compounds obtained in Examples 1 to 6, respectively.

The formation of the copper salt of acryloyloxyethylphthalate in the dry product was confirmed by the result of the X-ray analysis in FIG. 16.

Figure 7:
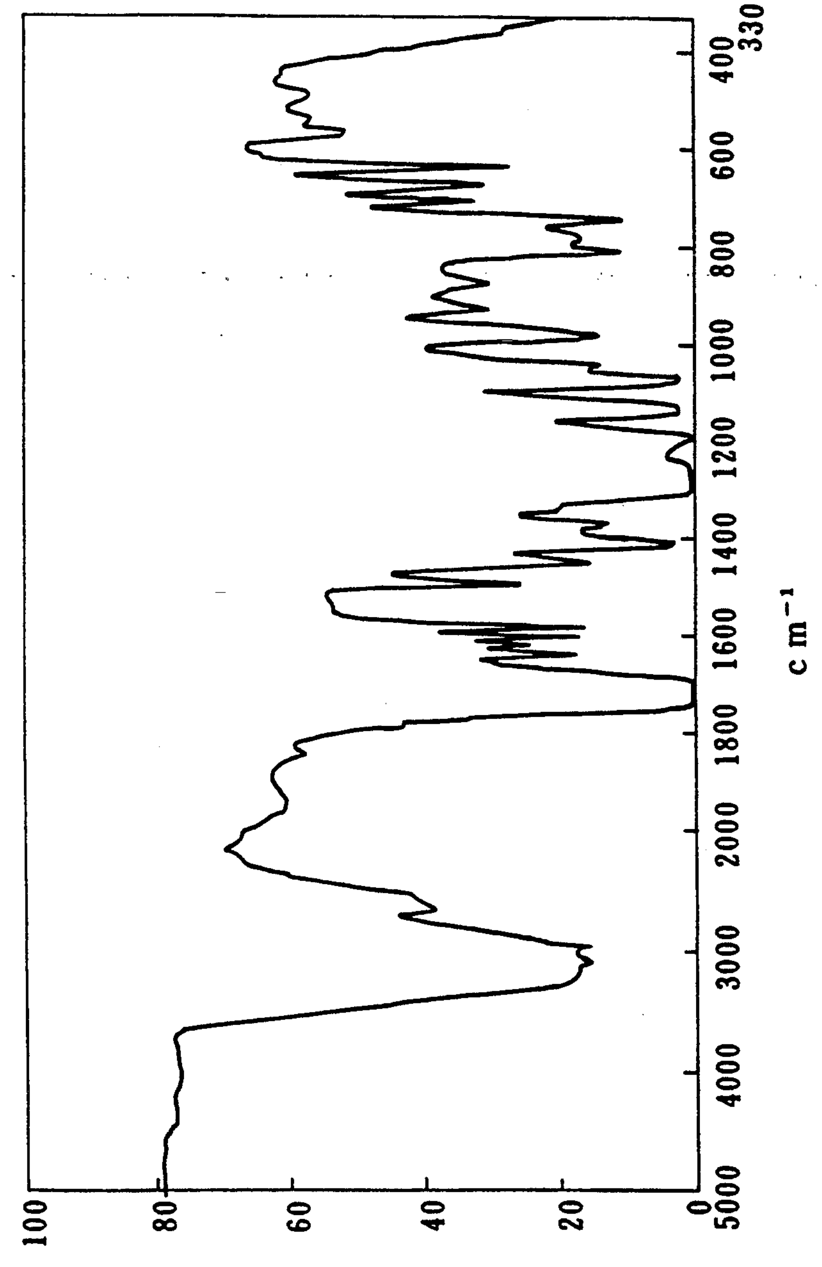
FIG. 7 is a graph showing the infrared absorption spectrum of acryloyloxyethyl hydrogenphthalate.
Figure 8:
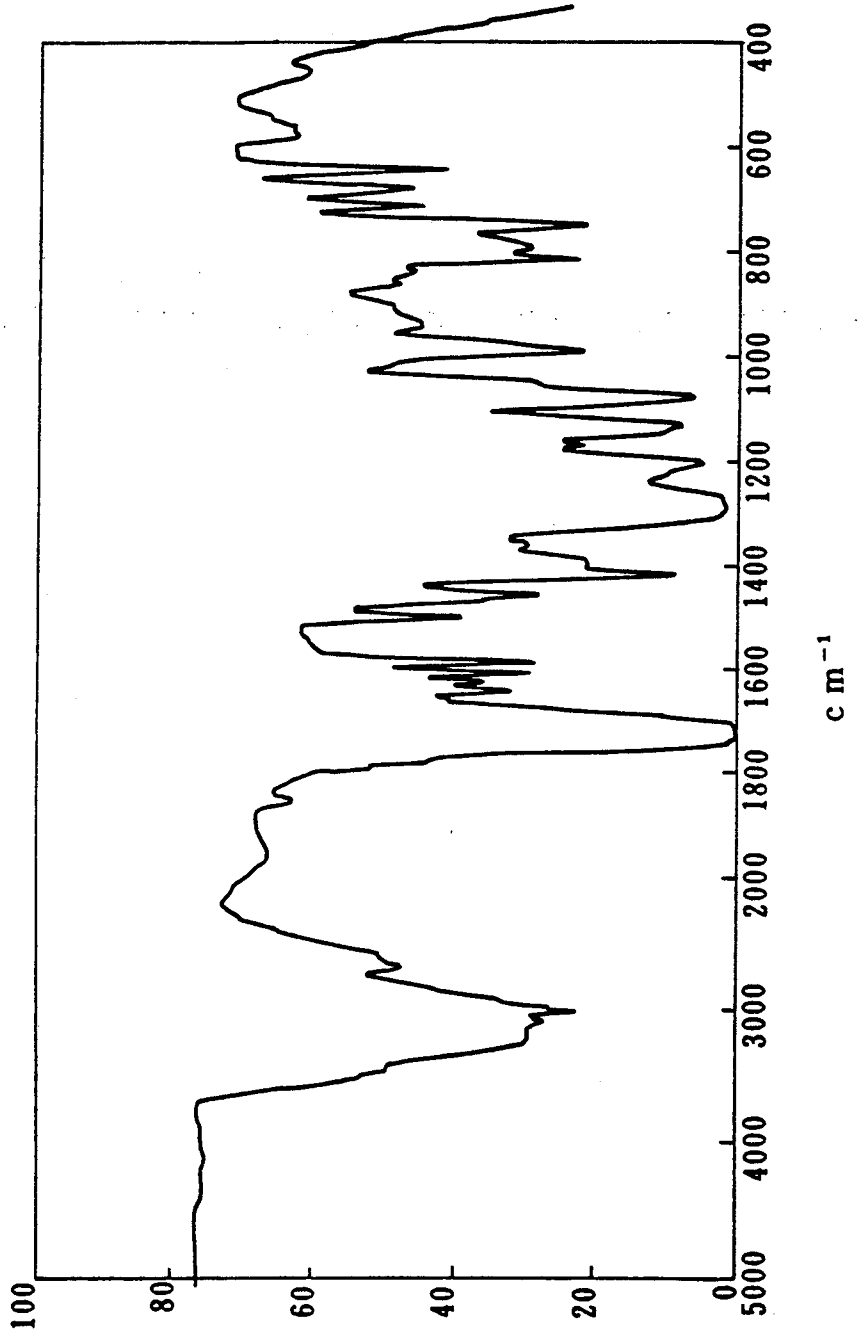
FIG. 8 is a graph showing the infrared absorption spectrum of acryloyloxyporpyl hydrogenphthalate.

The infrared absorption (IR) spectrum of the dry product is shown in FIG. 1 and the IR spectrum of the starting material is shown in FIG. 7.

The IR spectrum thereof shown in FIG. 1 clearly differed from that of the starting material, acryloyloxyethyl hydrogenphthalate shown in FIG. 7, and from that the absorptions of 2500 to 3300 $cm^{-1}$ originated from the stretching vibration of OH of the carboxylic acid were vanished, the formation of the copper salt of acryloyloxyethyl hydrogenphthalate was confirmed.

Figure 10:
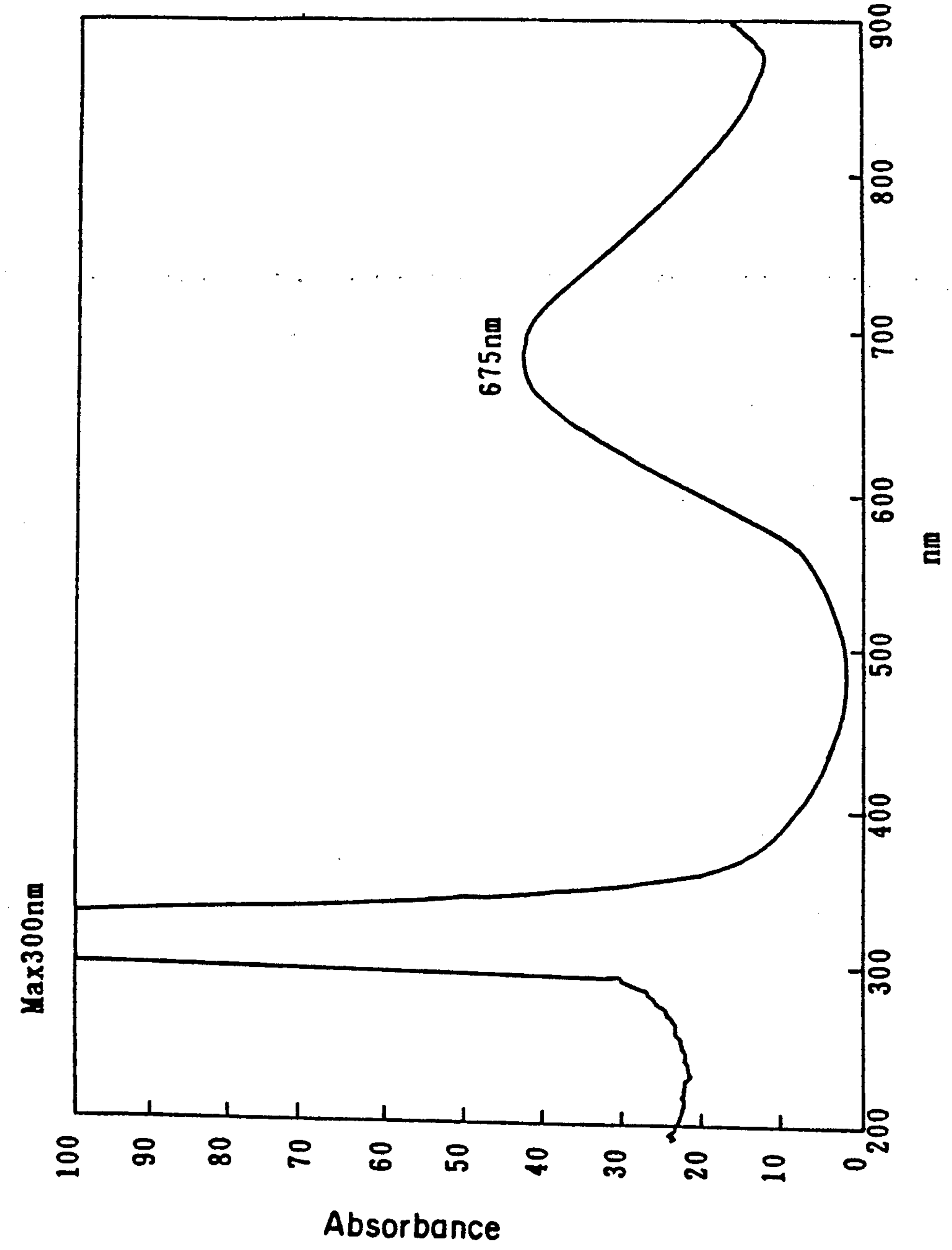
FIG. 10 to FIG. 15 are graphs showing the visible and ultraviolet absorption spectra of the organic metal compounds obtained in Examples 1 to 6, respectively.

Furthermore, the visible and ultraviolet absorptions of the compound were measured and the results are shown in FIG. 10.

As was clear from the figure, it was found that the visible and ultraviolet absorptions of the copper compound of this example in methyl methacrylate (MMA) showed very strong absorptions in the range of 300 to 325 n.m. and the copper compound had a shading effect to harmful ultraviolet rays.

Figure 11:
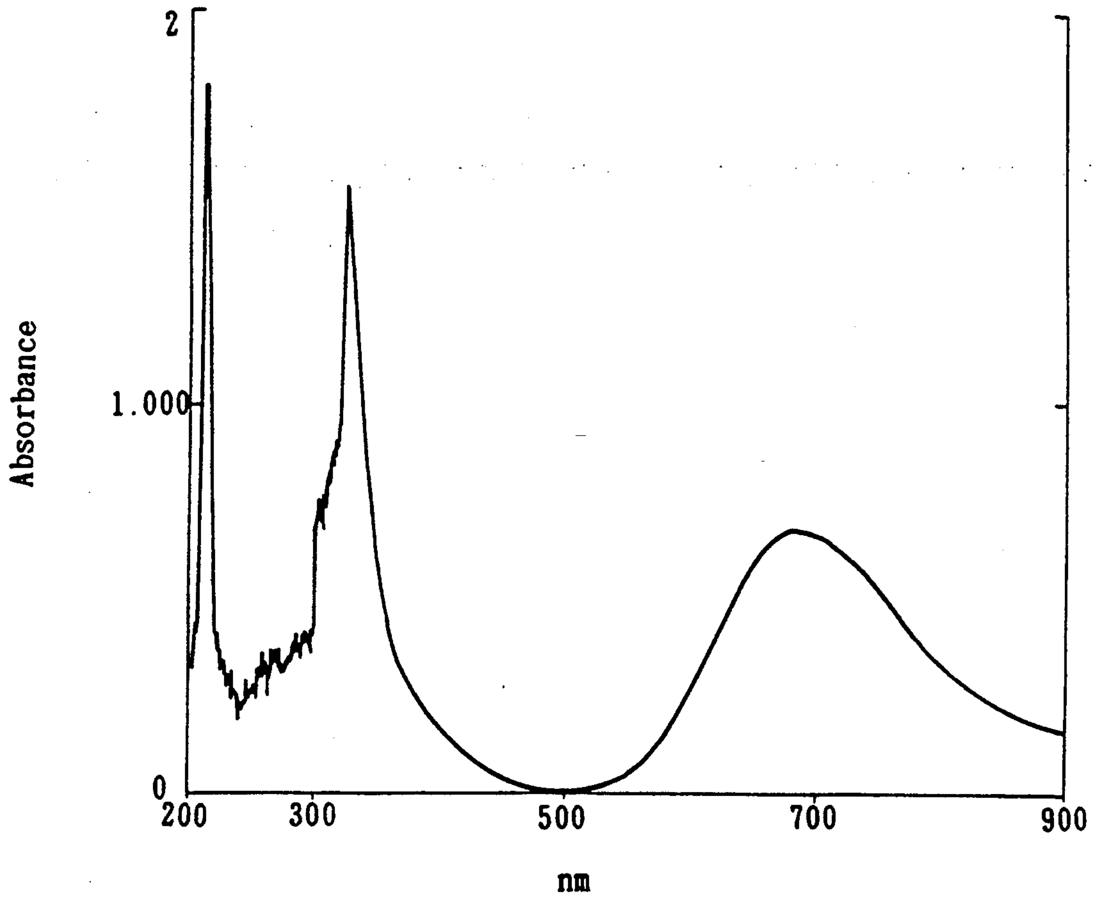

Also, the visible and ultraviolet absorptions of the same compound in acetone were measured and the results are shown in FIG. 11.

In addition, the analytical tests for the organic metal compound obtained in Example 1 were conducted as follows.

X-ray Analysis: The metal atom in each sample was measured using an X-ray microanalyzer (QX 2000T, made by JEOL LTD.)

Infrared Ray Absorption Spectrum: Each sample was measured by a KBr method using an infrared spectrophotometer (Type A-30, made by Nippon Bunko Kogyo K.K.).

Ultraviolet.Visible Absorption Spectra: Each sample was dissolved in MMA or acetone at a concentration of 3.0 m mol, the solution was placed in a quartz cell of 1 cm in side width, and was measured by a double beam spectrophotometer (UV-265FS, made by Shimazu Corporation).

EXAMPLE 2

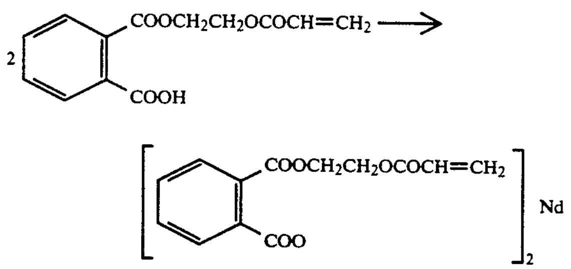

By following the same procedure as Example 1 using 2.3 g of neodymium chloride.hexa-hydrate in place of 2.5 g of copper(II) sulfate penta-hydrate, light purple precipitates were obtained.

The precipitates were slightly sticky in a wet state. The precipitates were washed with water, dried, and ground to provide 4.80 g of a dry product.

The melting point of the product was 103° C. and the result of the elemental analysis was as follows.

| | $(C_{13}H_{11}O_6)_2Nd$ = 670.74 | | |
|---|---|---|---|
| | C | H | O |
| Calculated: | 46.55% | 3.31% | 28.63% |

-continued

| $(C_{13}H_{11}O_6)_2Nd$ = 670.74 | C | H | O |
|---|---|---|---|
| Found: | 46.21% | 3.47% | 28.64% |

Figure 17:
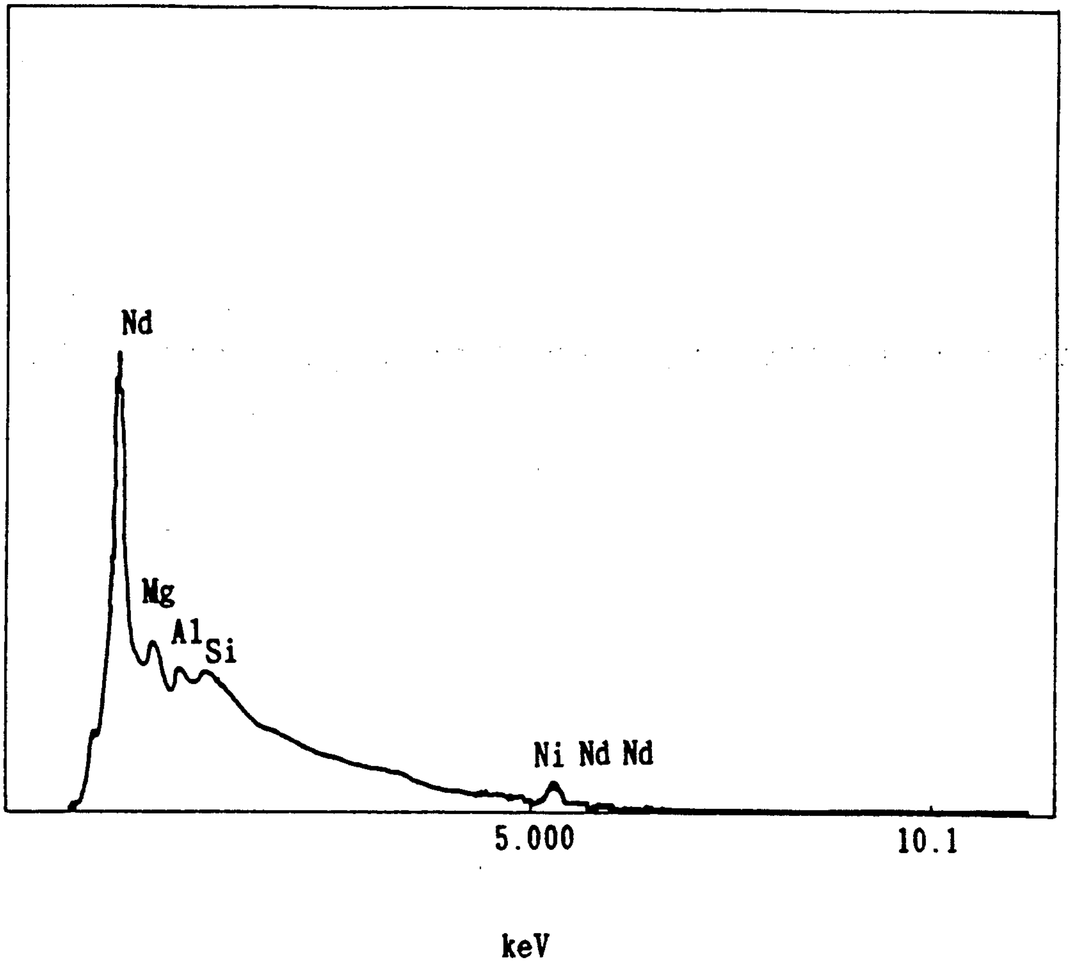

The existence of neodymium in the dry product was confirmed by the result of the X-ray analysis shown in FIG. 17.

Figure 2:
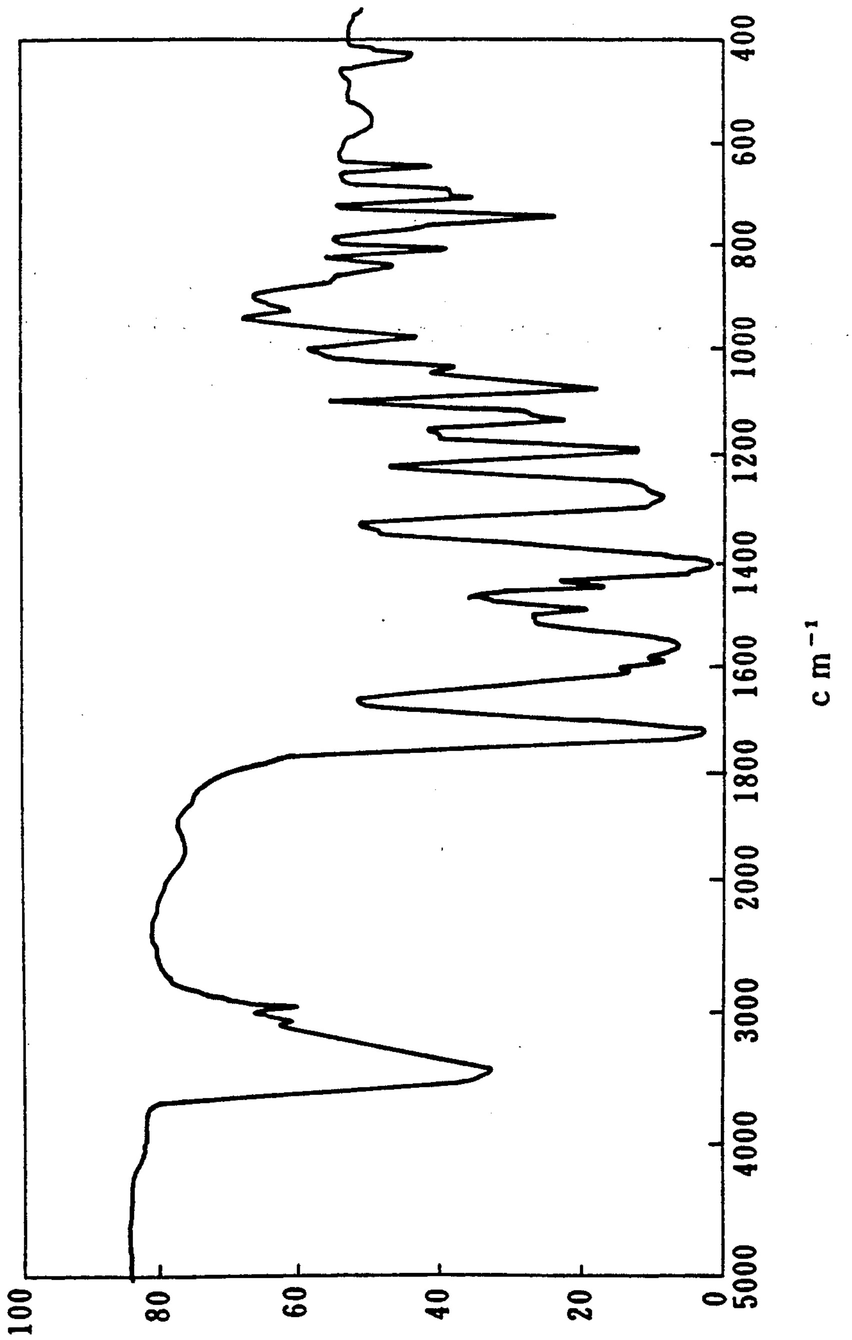
Figure 12:
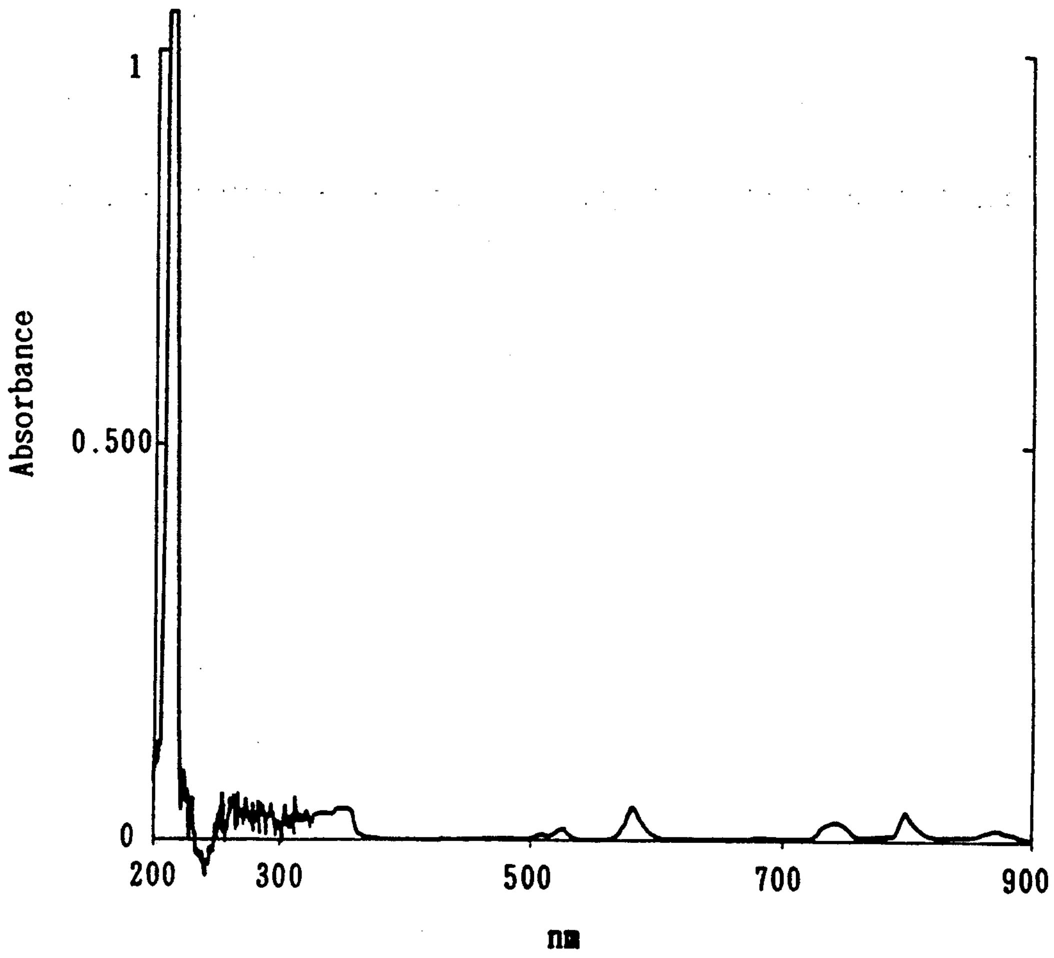

The IR spectrum of the product in acetone is shown in FIG. 2 and the visible and ultraviolet absorption spectra of the product are shown in FIG. 12.

The IR spectrum of the product clearly differs from that of the starting material, acryloyloxyethyl hydrogenphthalate shown in FIG. 7 and also from that the absorptions of 2500 to 3500 $cm^{-1}$ by the stretching vibration of OH of the carboxylic acid were vanished the formation of organic Nd compound was confirmed.

EXAMPLE 3

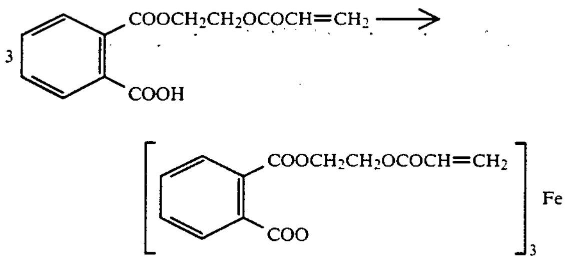

By following the same procedure as Example 1 using 3.4 g of iron(III) sulfate n-hydrate in place of 2.5 g of copper(II) sulfate penta-hydrate, precipitates were obtained. Furthermore, by performing the same post treatment as in Example 1, 4.55 g of a light brown dry product was obtained.

The melting point of the product was 107° C. and the result of the elemental analysis was as follows.

| $(C_{13}H_{11}O_6)_3Fe$ = 845.57 | C | H | O |
|---|---|---|---|
| Calculated: | 55.39 | 3.94 | 34.06% |
| Found: | 55.49% | 3.77% | 34.56% |

Figure 18:
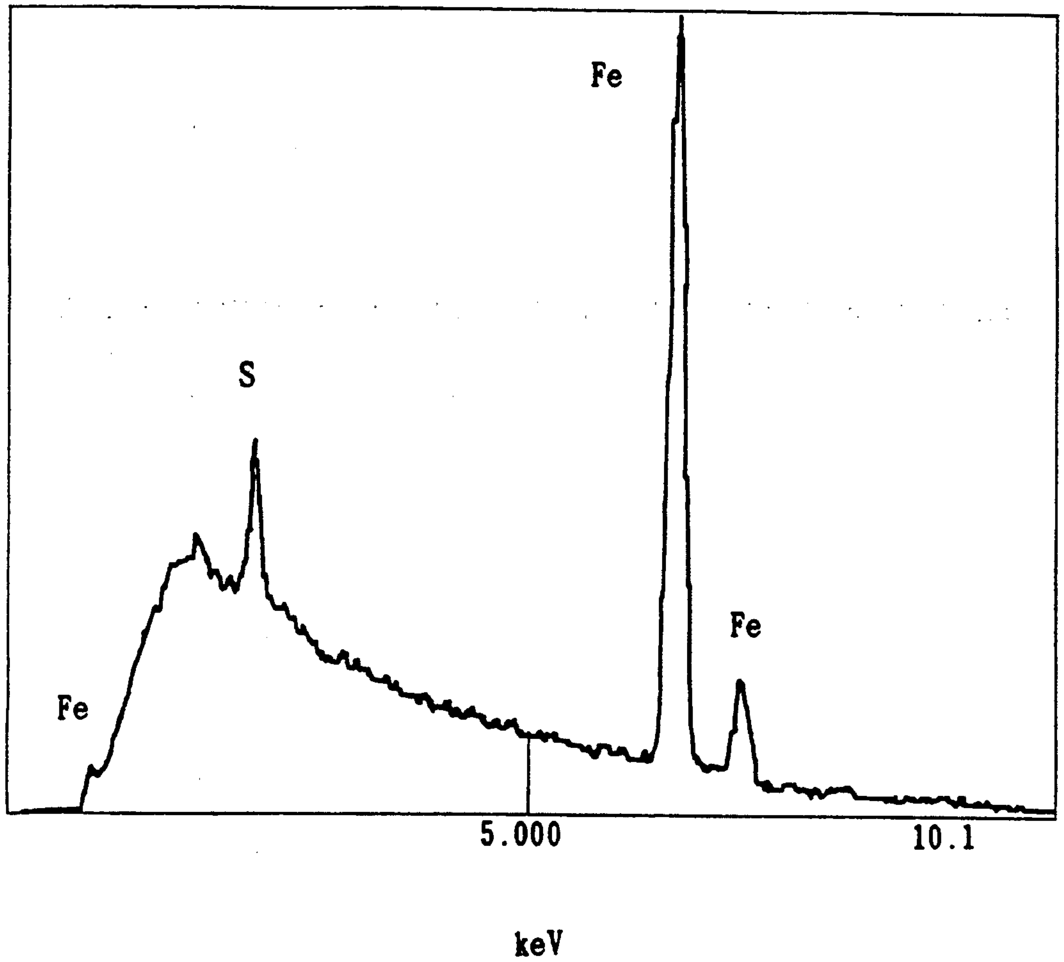

The X-ray analysis of the product is shown in FIG. 18.

Figure 3:
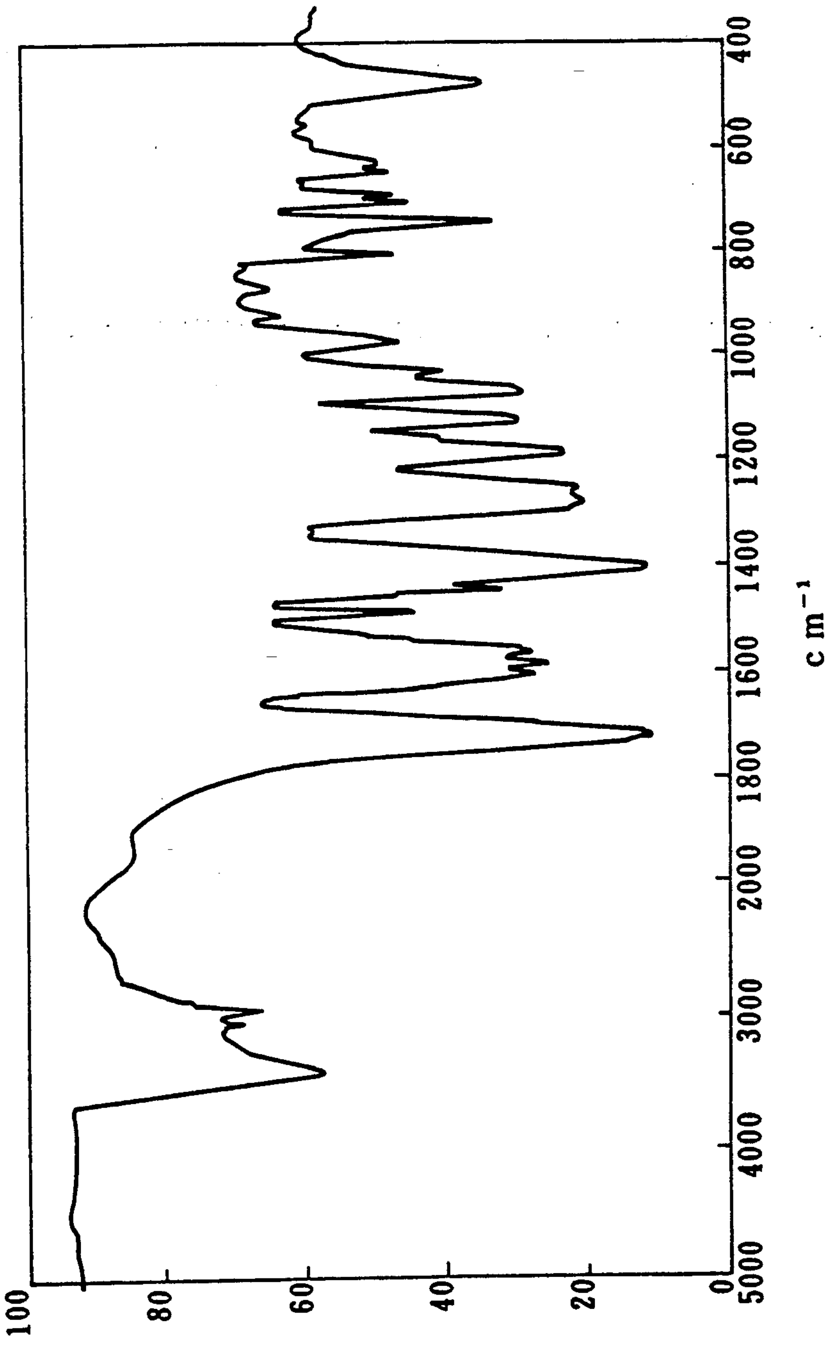
Figure 13:
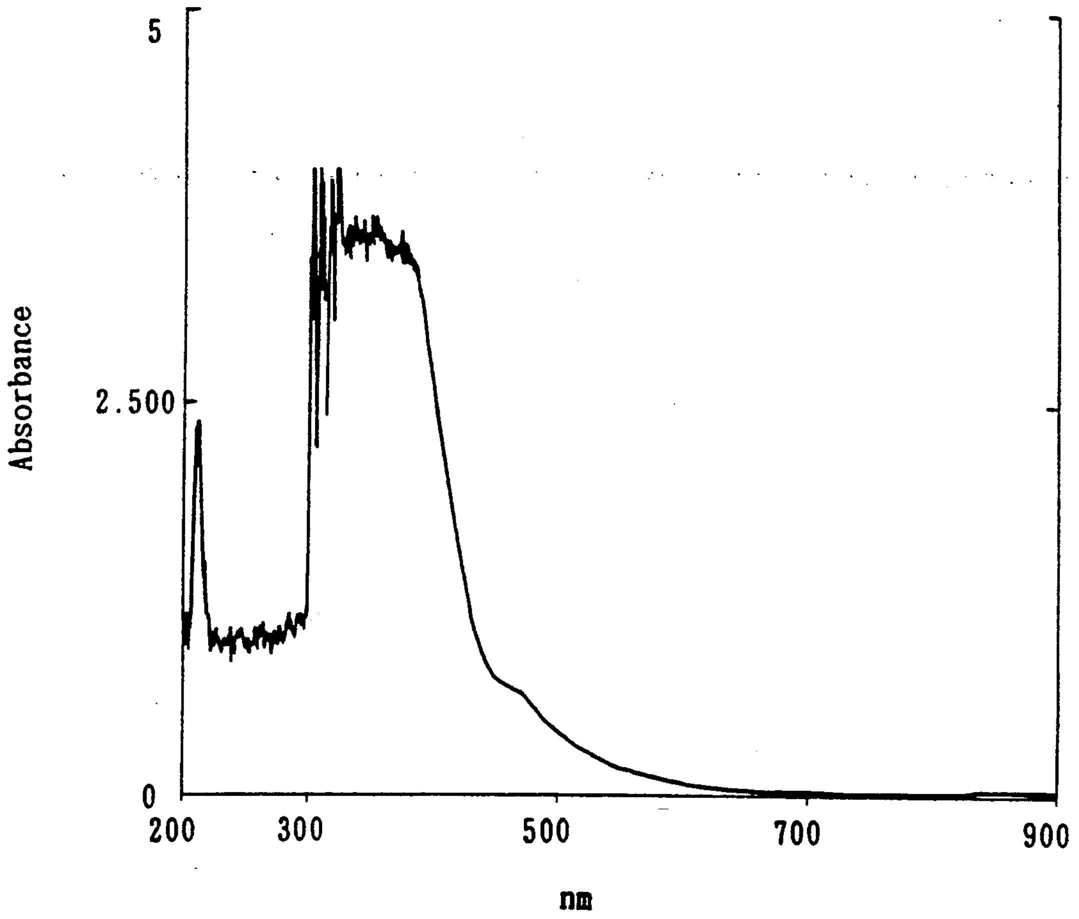

The IR spectrum of the product is shown in FIG. 3, and the visible and ultraviolet absorption spectra thereof are shown in FIG. 13.

The results showed that the IR spectrum of the product clearly differed from that of the starting product, acryloxyoxyethyl hydrogenphthalate and also from that the absorption of 2500 to 3500 $cm^{-1}$ by the stretching vibration of OH of the carboxylic acid were vanished, the formation of the organic Fe compound was confirmed.

EXAMPLE 4

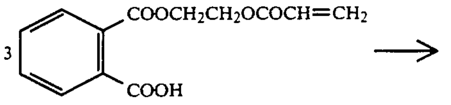

-continued

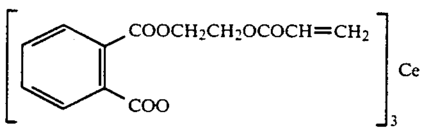

By following the same procedure as Example 1 using 3.4 g of cerium (III) sulfate n-hydrate in place of 2.5 g of copper(II) sulfate penta-hydrate, light brown precipitates were obtained. The precipitates were washed with water, dried, and ground to provide 4.3 g of a white organic Ce compound.

The melting point of the product was 106° C. and the result of the elemental analysis was as follows.

| $(C_{13}H_{11}O_6)_3Ce$ = 929.85 | C | H | O |
|---|---|---|---|
| Calculated: | 50.37% | 3.59% | 30.97% |
| Found: | 50.21% | 3.70% | 34.56% |

Figure 19:
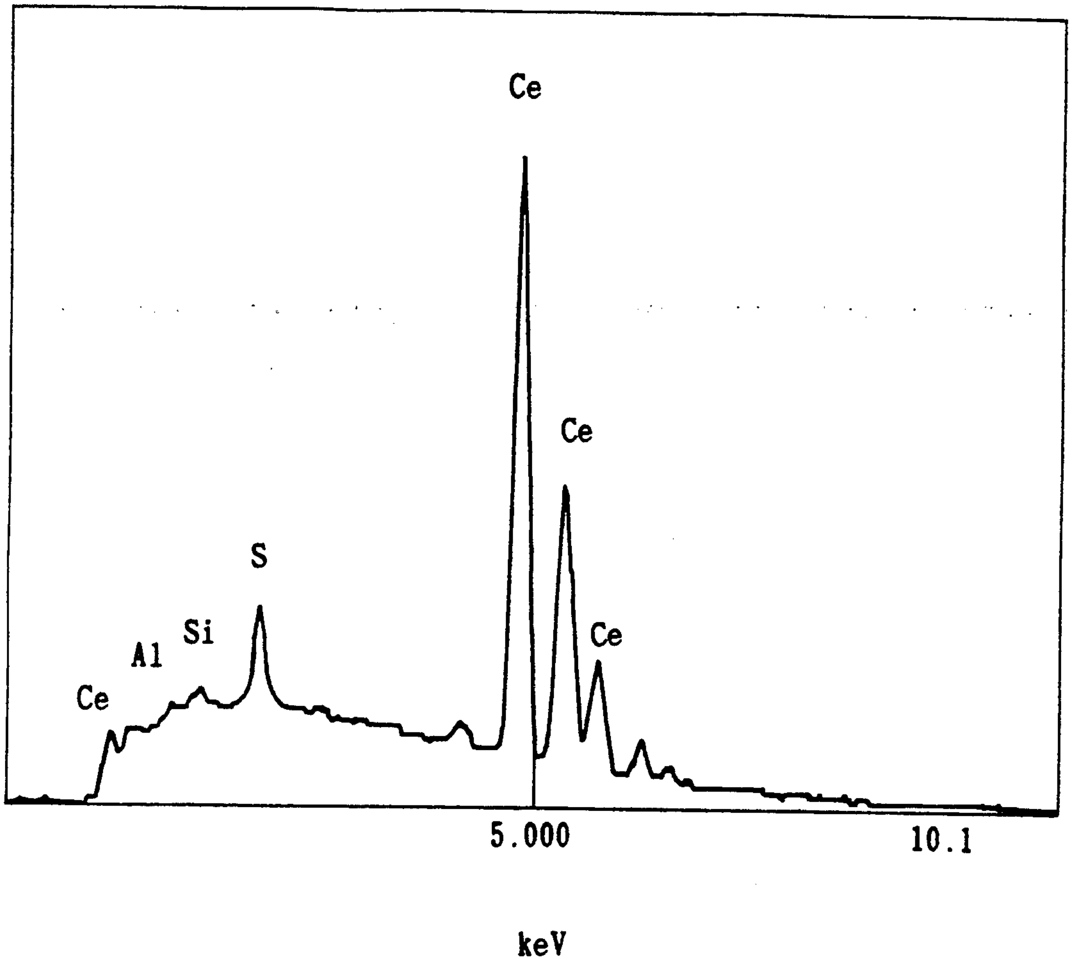

The X-ray analysis of the product is shown in FIG. 19.

Figure 4:
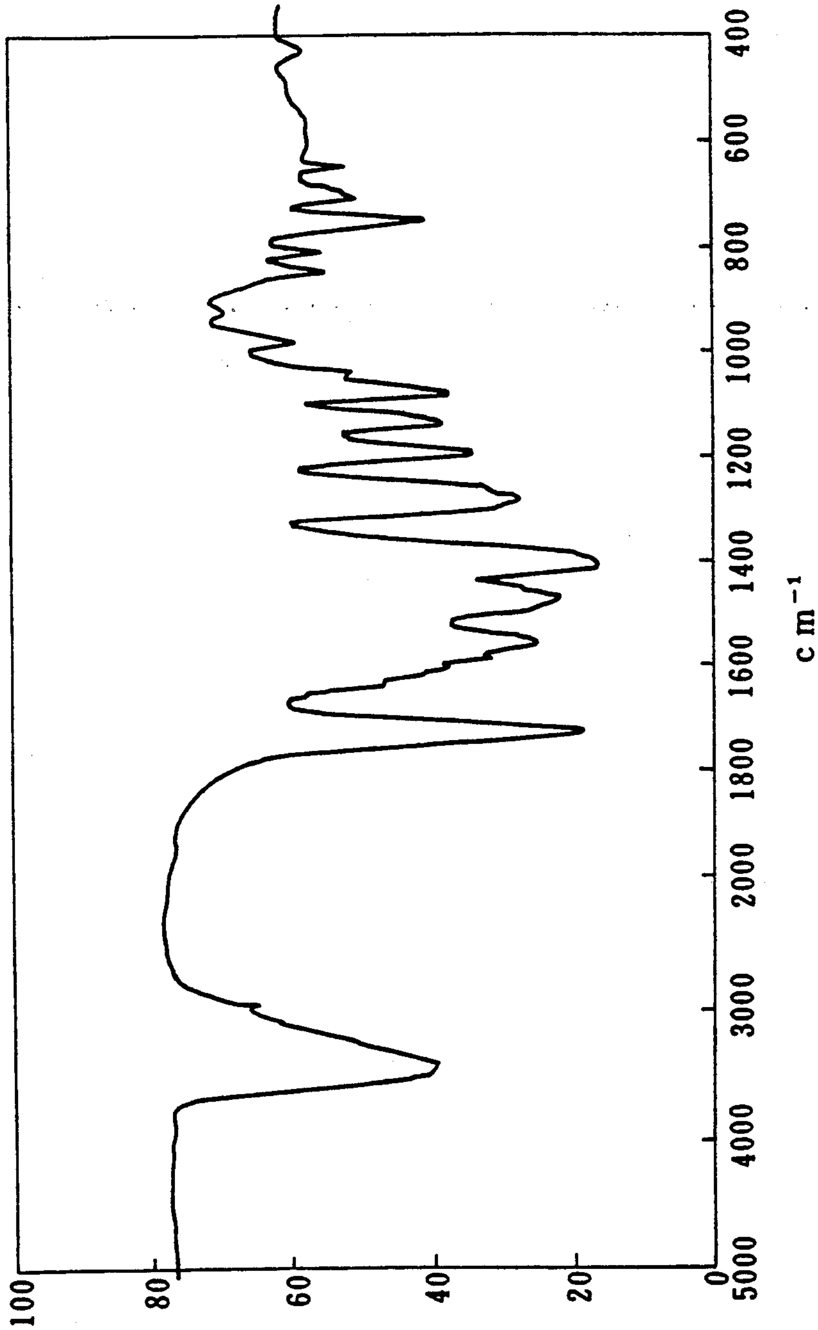

The IR spectrum of the product is shown in FIG. 4.

The result showed that the IR spectrum of the product clearly differed from that of the starting product, acryloyloxyethyl hydrogenphthalate shown in FIG. 7 and also the formation of the organic Ce compound was confirmed.

By following the same procedure as Example 1 using cobalt sulfate, lead sulfate, nickel sulfate, vanadium sulfate, or tungsten sulfate, the cobalt salt (pink color), the lead salt (white color), nickel salt (light blue color), vanadium salt (olive color), or tungsten salt (purple-blue color) of acroyloxyethyl hydrogenphthalate was obtained. From the X-ray analysis and the infrared spectra thereof, the formation of these salts were confirmed.

EXAMPLE 5

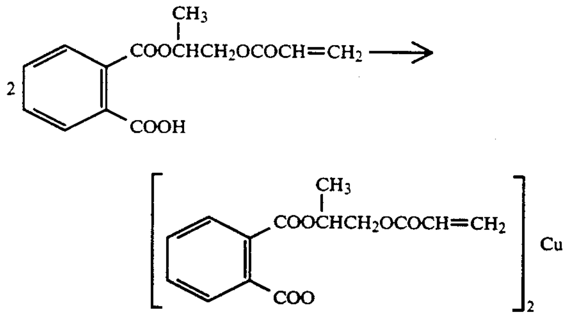

By following the same procedure as Example 1 using 5 g of acryloyloxypropyl hydrogenphthalate in place of 5 g of acryloyloxyethyl hydrogenphthalate, blue-green precipitates were obtained. Also, by further conducting the same post treatment as in Example 1, 4.75 g of a light green compound was obtained.

The melting point of the product was 105° C. and the result of the elemental analysis was as follows.

| $(C_{14}H_{13}O_6)_2Cu$ = 618.08 | C | H | O |
|---|---|---|---|
| Calculated: | 54.41 | 4.25 | 31.06 |

-continued

| $(C_{14}H_{13}O_6)_2Cu$ = 618.08 | C | H | O |
|---|---|---|---|
| Found: | 54.30 | 4.17 | 31.15 |

Figure 20:
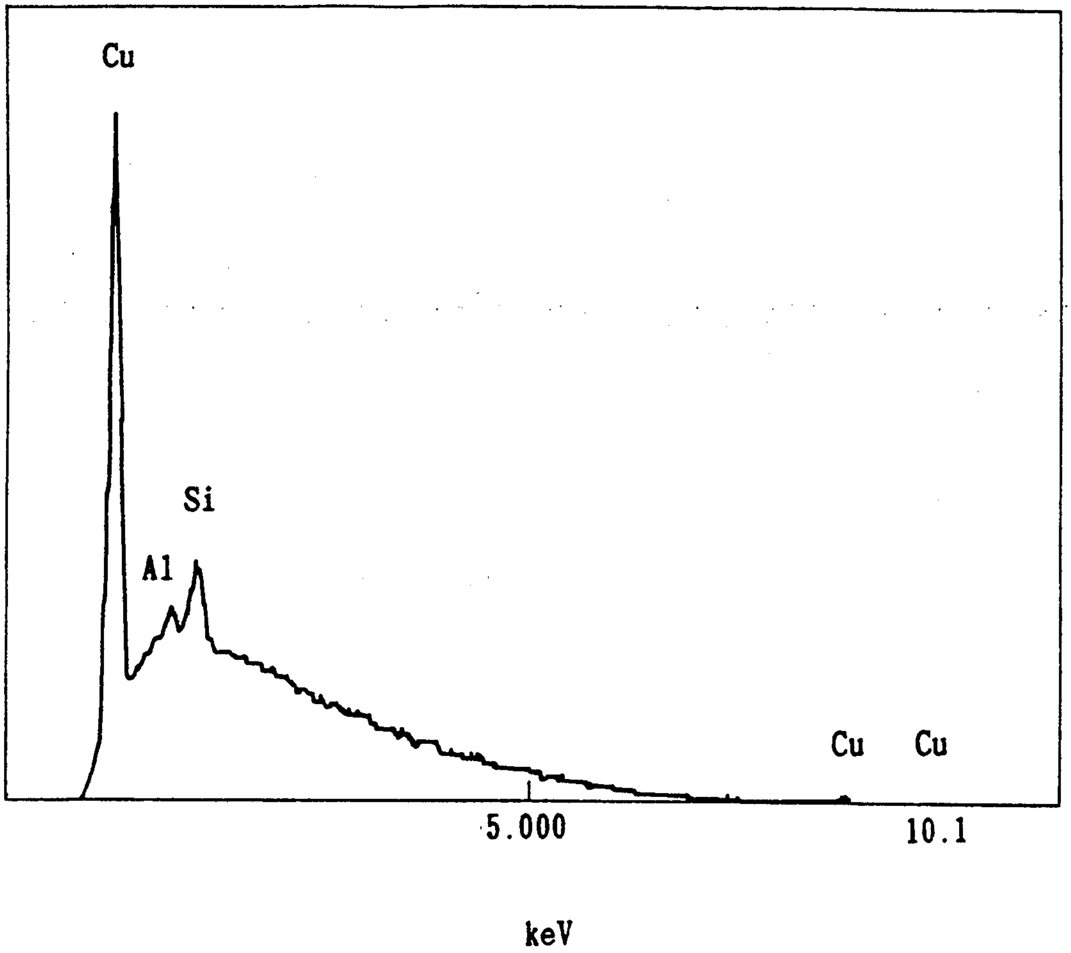

The X-ray analysis of the product is shown in FIG. 20.

Figure 5:
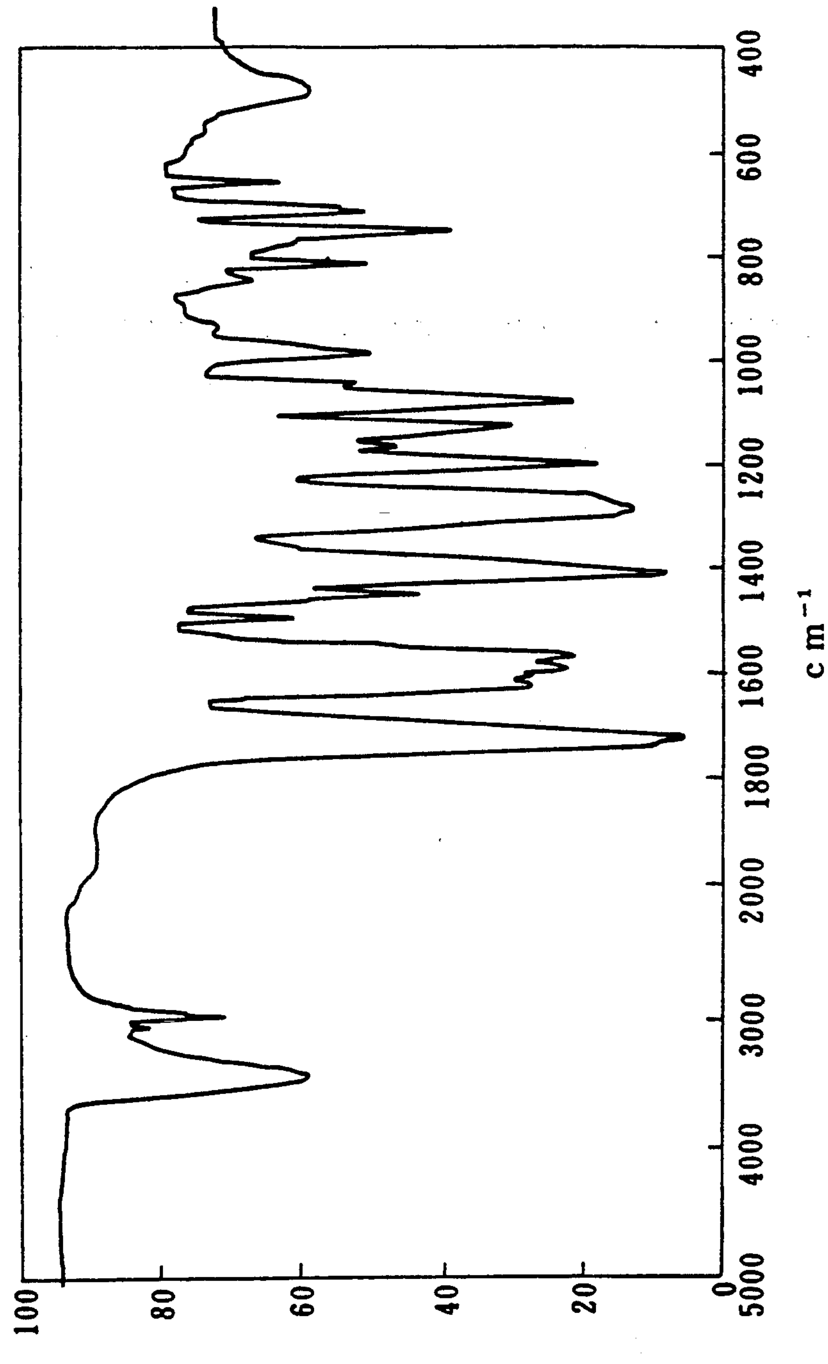
Figure 14:
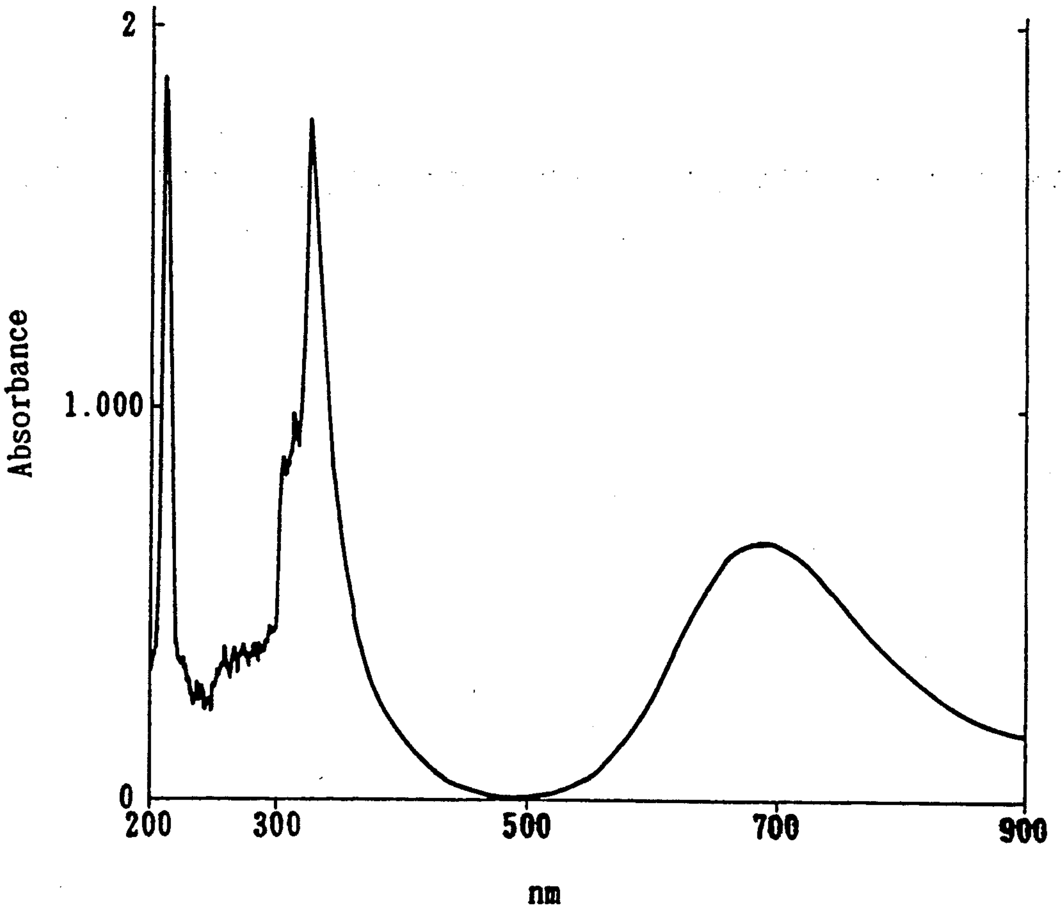

The IR spectrum of the organic Cu compound obtained is shown in FIG. 5 and the visible and ultraviolet absorption spectra are shown in FIG. 14. The results showed that the IR spectrum of the product clearly differed from that the starting product, acryloyloxypropyl hydrogenphthalate, and also the formation of an organic Cu compound was confirmed.

EXAMPLE 6

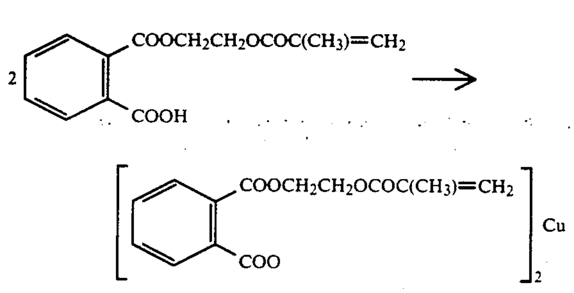

By following the same procedure as Example 1 using 5 g of methacryloyloxyethyl hydrogenphthalate in place of 5 g of acryloyloxyethyl hydrogenphthalate, blue-green precipitates were obtained. By further conducting the same post treatment as in Example 1, 4.2 g of a light green powdery compound was obtained.

The melting point of the product was 110° C. and the result of the elemental analysis was as follows.

| $(C_{14}H_{14}O_6)_2Cu$ = 612.41 | C | H | O |
|---|---|---|---|
| Calculated: | 54.91 | 4.62 | 31.35 |
| Found: | 54.78 | 4.53 | 31.50 |

Figure 21:
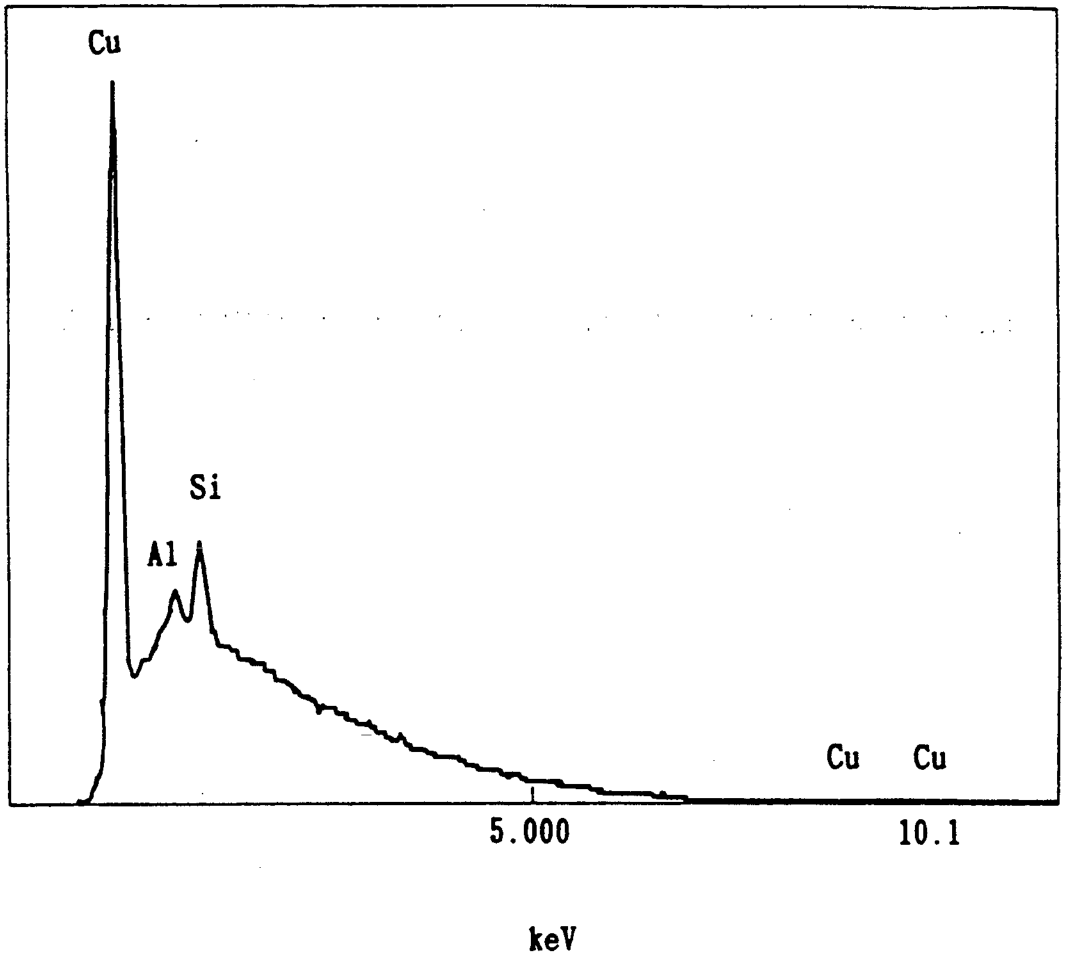

The X-ray analysis of the product is shown in FIG. 21.

Figure 6:
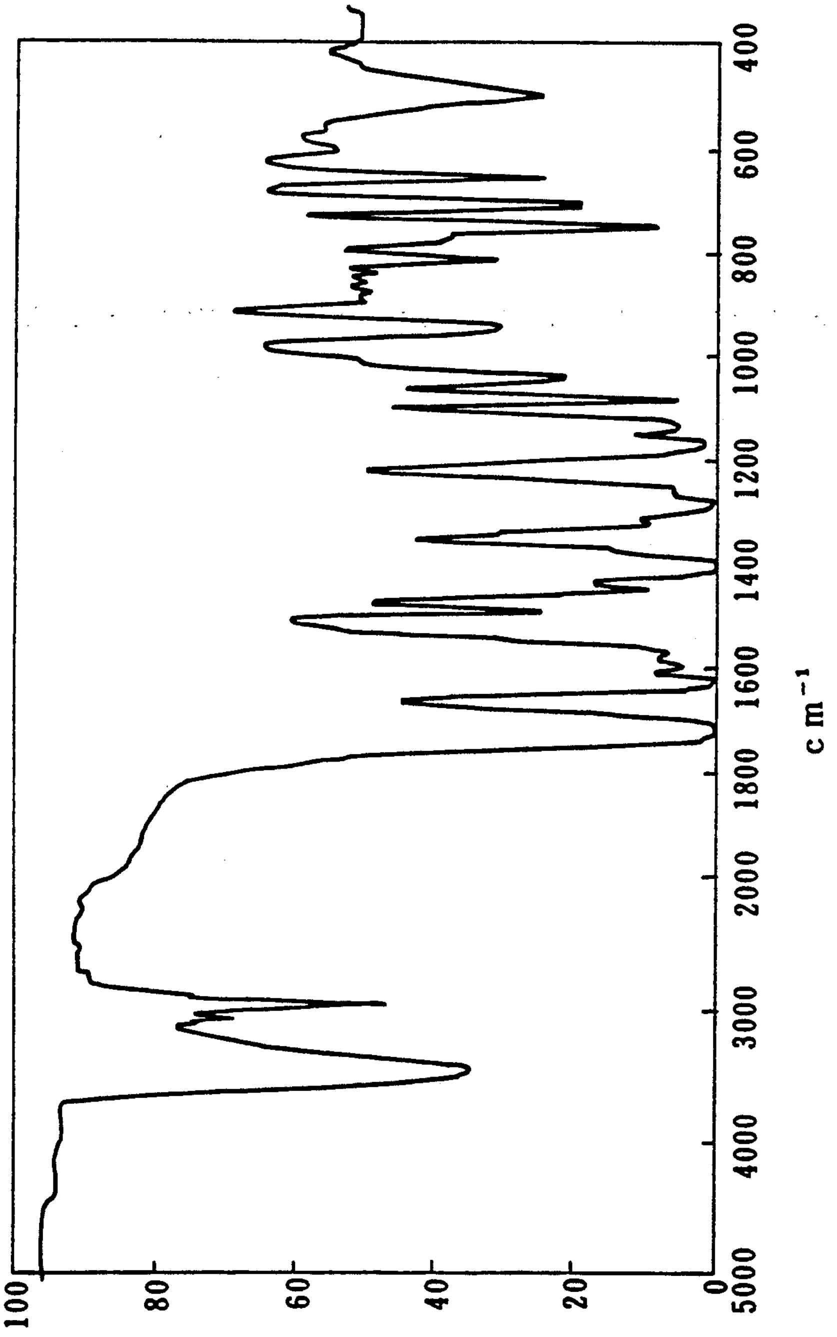
Figure 9:
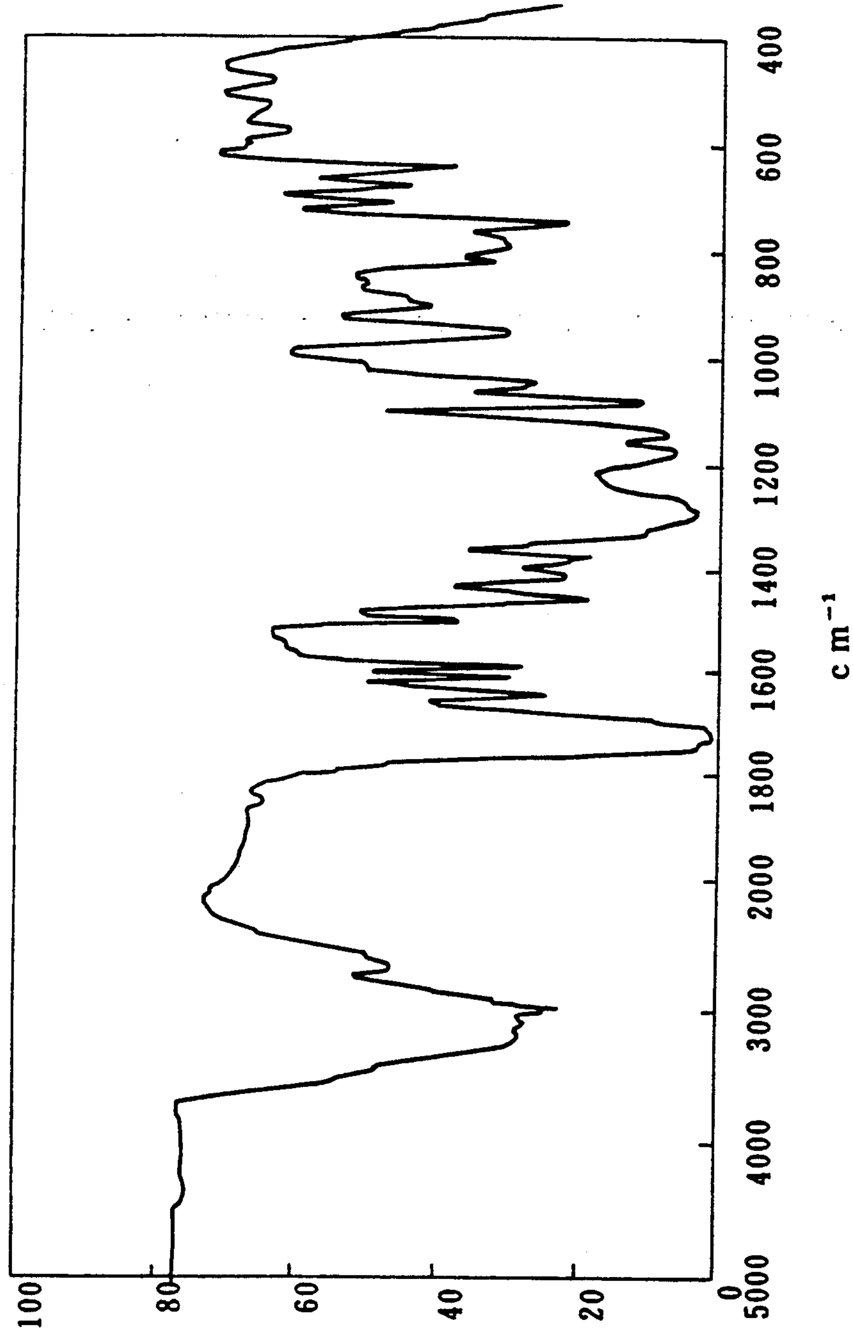
FIG. 9 is a graph showing the infrared absorption spectrum of methacryloyloxyethyl hydrogenphthalate.
Figure 15:
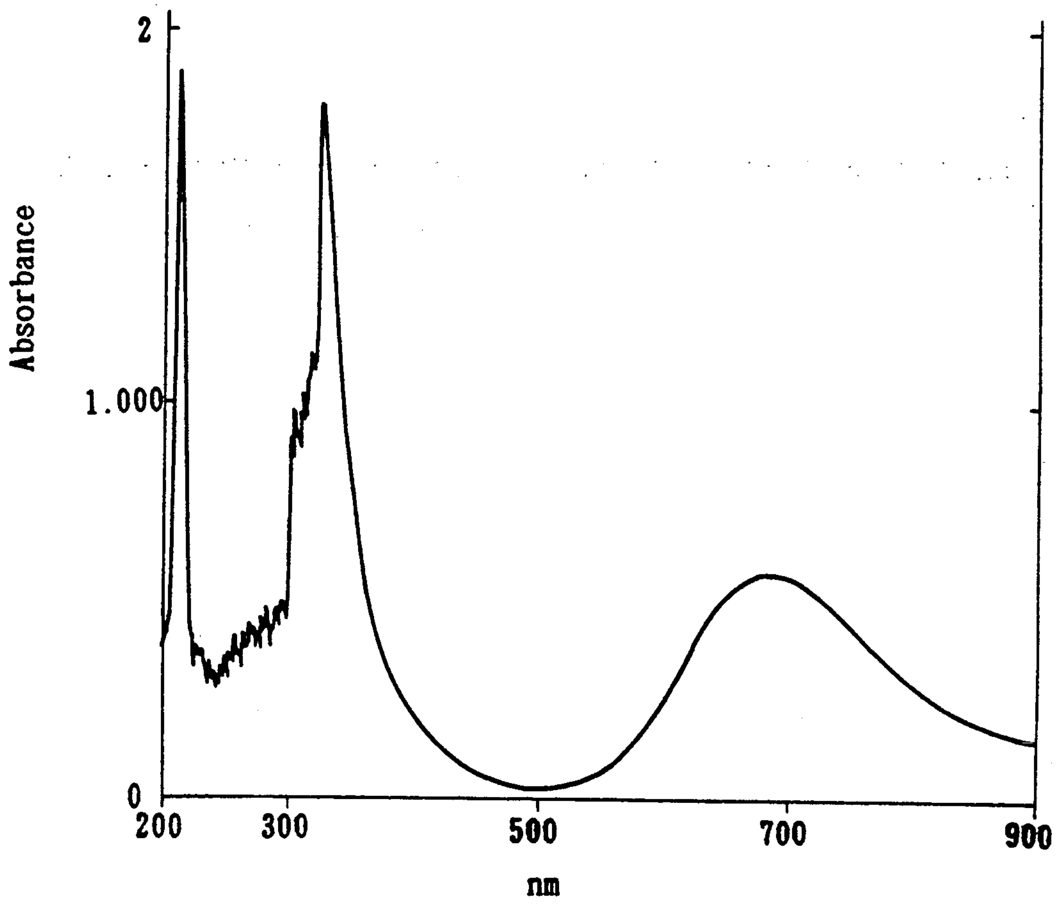

The IR spectrum of the organic Cu compound obtained is shown in FIG. 6 and the visible and ultraviolet absorption spectra thereof are shown in FIG. 15. The results showed that the IR spectrum of the product clearly differed from that of the starting material, methacryloyloxyethyl hydrogenphthalate shown in FIG. 9 and the formation of the organic Cu compound was confirmed.

The solubilities of the organic metal compounds obtained in aforesaid Example 1 to 6 in methyl methacrylate (MMA) are shown in Table 1.

That is, when 0.05 g, 0.5 g, or 1.25 g of each of the organic metal compounds of the phthalic acid derivative of this invention obtained in Examples 1 to 6 and other organic metal compounds was added to 5 g of MMA at 20° C., the case that the compound was completely dissolved was shown as o, the case that an insoluble matter slightly existed as Δ, and the case that a large amount of an insoluble matter existed as x.

TABLE 1

| Organic Metal Compound | 1% | 10% | 25% |
|---|---|---|---|
| Compound of Example 1 | ○ | ○ | ○ |
| Compound of Example 2 | ○ | ○ | ○ |
| Compound of Example 3 | ○ | ○ | ○ |
| Compound of Example 4 | ○ | Δ | × |
| Compound of Example 5 | ○ | ○ | Δ |
| Compound of Example 6 | ○ | ○ | ○ |
| Copper m-chlorobenzoate | x | x | x |
| Copper p-phenylbenzoate | x | x | x |
| Iron monobenzylphahate | x | x | x |
| Copper monobenzylphthalate | x | x | x |
| Copper p-tertiary-butyl salicylate | x | x | x |
| Copper-mercaptopyridine-N-oxide | x | x | x |
| Copper acetylacetonate | x | x | x |
| Neodymium acetylacetonate | x | x | x |

The results showed that the compounds in the examples of this invention has excellent solubility for MMA as compared with other known organic metal compounds.

EXAMPLE 7

In 100 parts by weight of methyl methacrylate was dissolved 1.77 parts by weight of the copper salt of acryloyloxyethyl hydrogenphthalate obtained in Example 1 and after adding thereto 0.5 part by weight of α, α'-isobuthyronitrile as a polymerization initiator, the compound was polymerized by heating to 60° to 80° C. in a hot water bath. The product was cast on a glass plate while it was viscous and further polymerized by heating to 90° C. to provide a light blue-green transparent plate having a thickness of 2 mm.

When light from a bromovideo light (L-2332, 300 watts, made by LPL Co.) as a ultraviolet light source was received by a ultraviolet ray intensity meter (UVR-1, made by Tokyo Kagaku Kikai K. K.) with an interval of 22 cm from the light source, the intensity thereof was 1.181 mW/cm².

When a polymethyl methacrylate plate containing 1.74% by weight the copper salt of acryloyloxethyl phthalate obtained in the example was placed directly before the light-receiving portion of the ultraviolet ray intensity meter, the meter showed an intensity of 0.103 mW/cm². On the other hand, when a polymethyl methacrylate plate having the same thickness as above without containing the copper salt of acryloyloxyethyl phthalate was placed at the same position, the intensity of ultraviolet rays was 1.122 mW/cm².

Thus, it was seen that the plate containing the copper salt of acryloyloxyethyl phthalate shaded about 90% of the ultraviolet rays.

EXAMPLE 8

In 100 parts by weight of methyl methacrylate was dissolved 0.3 part by weight of the copper salt of acryloyloxyethyl hydrogenphthalate obtained in Example 1 and after adding thereto 0.5 part by weight of α, α'-isobutyronitrile, the compound was polymerized by heating in a hot water bath to form a viscous product. Then, after dissolving 2 parts by weight of 5-chlorospironaphthoxazine to the product as a photochromic material, the mixture was cast on a glass plate and polymerized to provide a light blue-green transparent plate having a thickness of 3 mm.

When the plate was placed on the light-receiving portion of the ultraviolet ray intensity meter and was received ultraviolet rays from the bromovideo light as in Example 7, the intensity of the ultraviolet rays was 0.006 mW/$cm^2$, which showed that the plate completely shaded the ultraviolet rays. In this case, the plate was discolored from light blue-green to dark blue-green.

EXAMPLE 9

In 100 parts by weight of methyl methacrylate was dissolved 14 parts by weight of the Nd salt of acryloyloxyethyl hydrogenmethacrylate obtained in Example 2 and after adding thereto 0.5 part by weight of $\alpha,\alpha$-isobutyronitrile, the compound was polymerized by heating in a hot water bath to provide a viscous product. Then, after dissolving 2 parts by weight of 5-chlorospironaphoxazine in the product, the product was cast on a glass plate and polymerized to provide a light purple transparent plate having a thickness of 3 mm. The plate had a shading percentage of 45% to near infrared light of 800 n.m. and responded to ultraviolet rays, whereby it was discolored to purple. Also, when the plate was irradiated with the ultraviolet rays from the bromovideo light as in Example 7, the intensity was 0.008 mW/$cm^2$, which showed that the plate could substantially completely shaded the ultraviolet rays.

EXAMPLE 10

In 100 parts by weight of methyl methacrylate was dissolved 0.3 part by weight of the copper salt of acryloyloxyethyl hydrogenphthalate obtained in Example 1 and after adding thereto 0.5 part by weight of $\alpha,\alpha'$-isobutyronitrile as a polymerization initiator, the compound was polymerized by heating to 60° to 80° C. in a hot water bath. Then, 0.5 part by weight of diphenylurea was uniformly dissolved in the product, the mixture was cast on a glass plate and further polymerized by heating to 900° C. to provide a light olive transparent plate having a thickness of 3 mm. The ratio of copper to sulfur was 1:38 (Cu:S).

Figure 22:
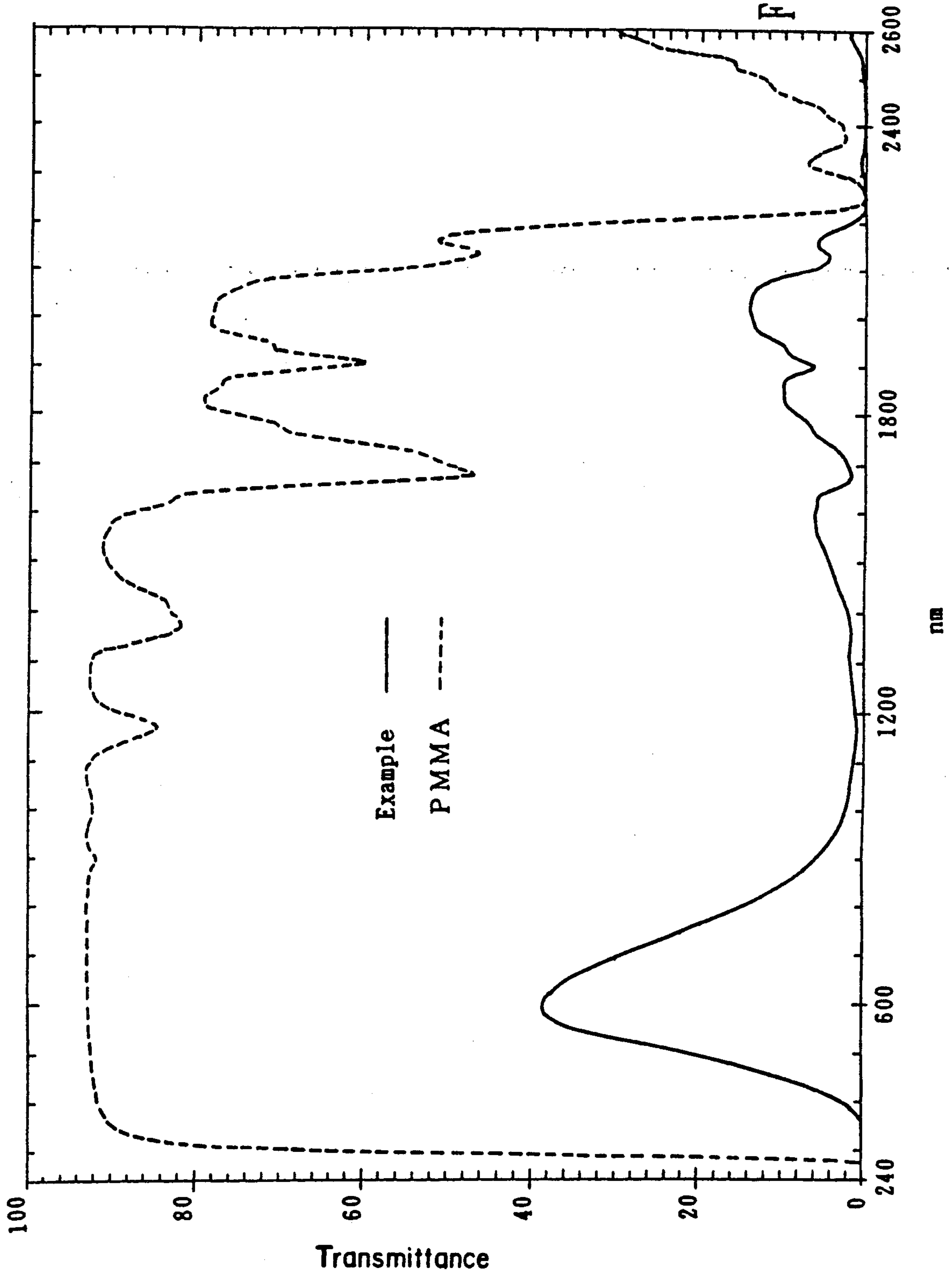
FIG. 22 is graph showing absorption spectra of the plate obtained by using the organic metal compound prepared in Example 1.

It has been found that the plate effectively shades ultraviolet ray portions of from 240 n.m. to 350 n.m. and near infrared ray portions of from 900 n.m. to 2600 n.m. as shown in FIG. 22.

Thus, when the plate is used for building materials in an exterior field as a heat-absorbing material having good viewing property, the plate can supply bright and cool light.

The transparent plate was obtained with the same procedure as the above mentioned procedure using 1,3-bis(m-chlorphenyl)thiourea, dibutylthiourea, 1-oxydiethylene-3-benzyl-2-thiourea or dicyclohexylthiourea in place of diphenylthiourea. The property of the obtained plates were same with the property of the above mentioned plate.

EXAMPLE 11

After mixing 0.1 parts by weight of the copper salt of acryloyloxyethyl hydrogenphthalate obtained in Example 1 and 0.4 part by weight of diphenylthiourea with 100 parts by weight of a polystyrene resin as natural resin, the resultant mixture was dry-blended. Then, colored pellets were prepared from the blend using an extruder and the pellets were extrusion molded to provide a light olive transparent plate having a thickness of 3 mm. The ratio of copper to sulfur was 1:9.2(by weight)(Cu:S).

The plate could shade near infrared rays in the wide range of from 900 n.m. to 2600 n.m. as in Example 10.

The plate with the same property as the above mentioned plate was obtained using polycarbonate or polymethacrylate instead of polyethylene resin.

EXAMPLE 12

After mixing 0.5 part by weight of the copper salt of acryloyloxyethyl hydrogenphthalate obtained in Example 1 and 0.5 part by weight of diethylthiourea with 100 parts by weight of a polyethylene resin as natural resin, the resultant mixture was dry-blended. Then, color pellets were prepared from the blend using an extruder and the pellets were extrusion-molded to provide a light olive transparent film having a thickness of 80 microns. The ratio of copper to sulfur was 1:2.4(by weight)-(Cu:S).

The film could cut about 50% of near infrared rays in the regions of from 950 n.m. to 2600 n.m.

EXAMPLE 13

In 100 parts by weight of methyl methacrylate was dissolved 0.2 part by weight of the lead salt of acryloyloxyethyl hydrogenphthalate obtained by the same manner as in Example 1 using lead sulfate in place of copper sulfate, and after adding thereto 0.5 part by weight of $\alpha,\alpha'$-isobutyronitrile as a polymerization initiator, the polymerization was conducted in an oil bath at 60° to 80° C. Then, 0.4 part by weight of thioacetanilide was added to the polymerization product, after uniformly dissolving therein, the mixture was cast on a glass plate while it was viscous, and the casted layer was further polymerized by heating to 90° C. to provide a light olive transparent plate having a thickness of 3 mm.

The ratio of lead(Pb):sulfur in the product was 1:7.8 by weight ratio.

It was confirmed that the plate could effectively shade ultraviolet rays of from 240 n.m. to 400 n.m. and near infrared rays of fro, 900 n.m. to 2,600 n.m.

Also, when the same procedure as above was followed using thioacetamide, thiobenzanilide, or thionicotinamide in place of thioacetanilide, almost the same result was obtained in each case.

What is claimed is:

1. A novel phthalic acid derivative metal salt represented by the formula (I):

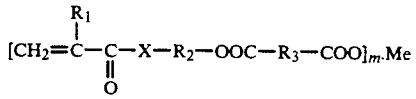

(I)

wherein $R_1$ is selected from the group consisting of a hydrogen atom and a lower alkyl group; —X— is selected from the group consisting of —O— and —NH—; $R_2$ is a $-(CH_2)_n-$ group which may be substituted by a substituent selected from the group consisting of a lower alkyl group, a halogen atom, at least one methylene group in the formula $-(CH_2)_n-$ may be substituted by at least one substituent selected from the group consisting of a phenylene group having the formula

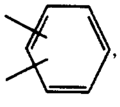

,

—CH═CH— and combinations thereof; $R_3$ is a member selected from the group consisting of a phenylene group having the formula

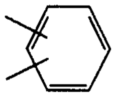

and a cyclohexylene group having the formula

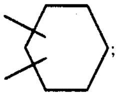;

Me is selected from the group consisting of Cu, Nd, Co, Fe, Ni, V, VO, W and Ce; m is 2 or 3; and n is an integer of from 1 to 5.

2. The novel phthalic acid derivative metal salt as claimed in claim 1, wherein the compound shown by formula (I) is a metal salt of an acryloyloxyalkyl hydrogenphthalate represented by following formula;

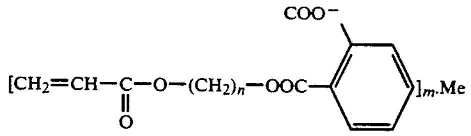

wherein Me, m, and n have the same meaning as in claim 1.

* * * * *